United States Patent
Berner et al.

(10) Patent No.: US 12,314,554 B1
(45) Date of Patent: May 27, 2025

(54) APPARATUS AND A METHOD FOR PROVIDING A CUSTOMIZABLE AND INTERACTIVE AMBIENT SOUND EXPERIENCE

(71) Applicant: Pocket Bard LLC, Jersey City, NJ (US)

(72) Inventors: Alex Berner, Jersey City, NJ (US); Charles Stacy Harris, IV, Astoria, NY (US); Jason Kovalski, Jersey City, NJ (US)

(73) Assignee: Pocket Bard LLC, Jersey City, NJ (US)

( * ) Notice: Subject to any disclaimer, the term of this patent is extended or adjusted under 35 U.S.C. 154(b) by 0 days.

(21) Appl. No.: 18/813,523

(22) Filed: Aug. 23, 2024

(51) Int. Cl.
*G06F 3/04847* (2022.01)
*G06F 3/16* (2006.01)

(52) U.S. Cl.
CPC .......... *G06F 3/04847* (2013.01); *G06F 3/165* (2013.01)

(58) Field of Classification Search
CPC .............................. G06F 3/04847; G06F 3/165
See application file for complete search history.

(56) References Cited

U.S. PATENT DOCUMENTS

| | | |
|---|---|---|
| 2008/0139284 A1 | 6/2008 | Pryzby et al. |
| 2014/0128160 A1 | 5/2014 | Gillet et al. |
| 2014/0137162 A1* | 5/2014 | McNamee ......... H04N 21/2187 725/63 |
| 2014/0302932 A1 | 10/2014 | Hilbert |
| 2016/0142846 A1* | 5/2016 | Herre ...................... H04S 3/008 381/23 |
| 2020/0374649 A1* | 11/2020 | Hestermann ............ G10L 19/00 |
| 2022/0248160 A1* | 8/2022 | Liu .......................... G06F 3/013 |
| 2024/0129674 A1* | 4/2024 | Casper ................ G10L 21/0208 |

FOREIGN PATENT DOCUMENTS

IN 202311075195 A 12/2023

* cited by examiner

*Primary Examiner* — Seth A Silverman
(74) *Attorney, Agent, or Firm* — Caldwell Intellectual Property Law

(57) ABSTRACT

An apparatus for providing a customizable and interactive ambient sound experience, comprising a computing device configured to populate a user interface (UI) data structure presenting selectable sound categories by generating configurable audio outputs, each having audio parameters, for each selectable sound category, initializing audio settings linked audio parameters, and populate the UI data structure using configurable audio outputs and audio settings, transmit the populated UI data structure to a downstream device, adjust, in response to a user input targeting a first set of configurable audio outputs, at least one audio setting to modify the audio parameters linked to the first set of configurable audio outputs, and output, at the downstream device, the first set of configurable audio outputs by overlaying the first set of configurable audio outputs with a second set of configurable audio outputs to create a composite audio output, and outputting the composite audio output.

16 Claims, 11 Drawing Sheets

APPARATUS AND A METHOD FOR PROVIDING A CUSTOMIZABLE AND INTERACTIVE AMBIENT SOUND EXPERIENCE

FIELD OF THE INVENTION

The present invention generally relates to the field of audio processing. In particular, the present invention is directed to an apparatus and a method for providing a customizable and interactive ambient sound experience.

BACKGROUND

Traditional methods of integrating sound and music into various setting often fall short of providing immersive and interactive experiences that users crave. This gap is particularly evident in areas such as storytelling, gaming, virtual reality, and other forms of digital content creation, where the right ambiance and sound effects can significantly elevate the overall user experience. Existing audio systems often rely on pre-recorded soundtracks and effects that do not dynamically adapt to the user's actions or environmental changes, leading to a less engaging experience.

SUMMARY OF THE DISCLOSURE

In an aspect, an apparatus for providing a customizable and interactive ambient sound experience is described. The apparatus includes at least a processor, and a memory communicatively connected to the at least a processor, wherein the memory contains instructions configuring the at least a processor to populate a user interface data structure configured to present a plurality of selectable sound categories, wherein populating the user interface data structure includes generating a plurality of configurable audio outputs for each selectable sound category of the plurality of selectable sound categories, wherein each configurable audio output of the plurality of configurable audio outputs comprises one or more audio parameters, initializing a plurality of audio settings for the plurality of configurable audio outputs, wherein each audio setting of the plurality of audio settings is linked to the one or more audio parameters, and populate the user interface data structure as a function of the plurality of configurable audio outputs and the plurality of audio settings. The processor is further configured to transmit the populated user interface data structure to a downstream device, adjust, in response to at least a user input targeting a first set of configurable audio outputs of the plurality of configurable audio outputs associated with a first selectable sound category of the plurality of selectable sound categories, at least one audio setting of the plurality of audio settings to modify the audio parameters linked to the first set of configurable audio outputs, and output, at the downstream device, the first set of configurable audio outputs, wherein outputting the first set of configurable audio outputs includes overlaying the first set of configurable audio outputs with a second set of configurable audio outputs to create a composite audio output, and outputting the composite audio output using the downstream device.

In another aspect, a method for providing a customizable and interactive ambient sound experience is illustrated. The method includes populating, by at least a processor, a user interface data structure configured to present a plurality of selectable sound categories, wherein populating the user interface data structure includes generating a plurality of configurable audio outputs for each selectable sound category of the plurality of selectable sound categories, wherein each configurable audio output of the plurality of configurable audio outputs includes one or more audio parameters, initializing a plurality of audio settings for the plurality of configurable audio outputs, wherein each audio setting of the plurality of audio settings is linked to the one or more audio parameters, and populate the user interface data structure as a function of the plurality of configurable audio outputs and the plurality of audio settings, transmitting, by the at least a processor, the populated user interface data structure to a downstream device, adjusting, by the at least a processor, in response to at least a user input targeting a first set of configurable audio outputs of the plurality of configurable audio outputs associated with a first selectable sound category of the plurality of selectable sound categories, at least one audio setting of the plurality of audio settings to modify the audio parameters linked to the first set of configurable audio outputs, and outputting, by the at least a processor, the first set of configurable audio outputs at the downstream device, wherein outputting the first set of configurable audio outputs includes overlaying the first set of configurable audio outputs with a second set of configurable audio outputs to create a composite audio output, and outputting the composite audio output using the downstream device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1A:
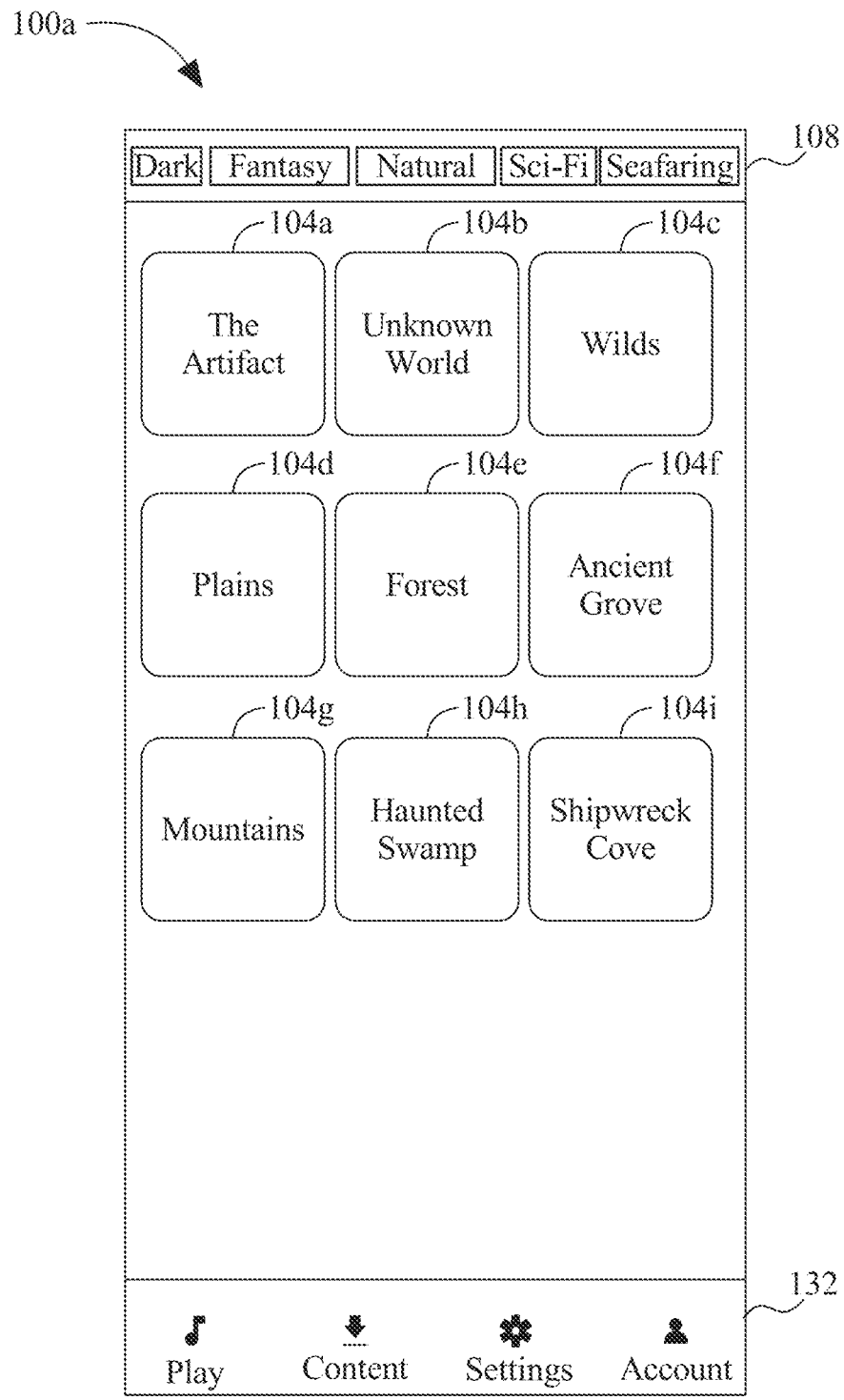
FIGS. 1A-D are exemplary embodiments of a user interface data structure.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for providing a customizable and interactive ambient sound experience. Apparatus as described herein may be designed for applications in gaming, virtual reality, augmented reality, and various multimedia environment where the auditory experience is crucial in enhancing the user's immersion and engagement. As a non-limiting example, apparatus may be integrated into the gameplay of a board game. Players may be able to select appropriate sound scene corresponding to the game stages, regions, or events. In some cases, sound scene may be dynamically adjusted based on, for example, at least in part, real-time inputs from players or game master, or even introducing new sound elements based on the evolving game scenario. It should be noted that while the primary application is in gaming and multimedia environments, apparatus's 100 utility may extend to other areas, such as, without limitation, education, meditation, sports, therapy, exhibitions, among others. For example, and without limitation, in an educational setting, apparatus may be used to create immersive historical reenactments or interactive science lessons where the sound environment dynamically adapts to the educational content, thereby enhancing users, such as student's learning engagement and retention.

Aspects of the present disclosure can be used to delivering a dynamic and immersive auditory environment. Apparatus includes a computing device configured to populate a user interface data structure configured to present a plurality of selectable sound categories, wherein populating the user interface data structure includes generating a plurality of configurable audio outputs for each selectable sound category of the plurality of selectable sound categories, wherein each configurable audio output of the plurality of configurable audio outputs includes one or more audio parameters, initializing a plurality of audio settings for the plurality of configurable audio outputs, wherein each audio setting of the plurality of audio settings is linked to the one or more audio parameters, and populate the user interface data structure as a function of the plurality of configurable audio outputs and the plurality of audio settings. The computing device is then configured to transmit the populated user interface data structure to a downstream device, adjust, in response to at least a user input targeting a first set of configurable audio outputs of the plurality of configurable audio outputs associated with a first selectable sound category of the plurality of selectable sound categories, at least one audio setting of the plurality of audio settings to modify the audio parameters linked to the first set of configurable audio outputs, and output, at the downstream device, the first set of configurable audio outputs, wherein outputting the first set of configurable audio outputs includes overlaying the first set of configurable audio outputs with a second set of configurable audio outputs to create a composite audio output, and outputting the composite audio output using the downstream device. Exemplary embodiments illustrating aspects of the present disclosure are described below in the context of several specific examples.

Referring now to FIGS. 1A-D, exemplary embodiment of a user interface data structure 100a-d is illustrated. As used in this disclosure, a "user interface data structure" is an organized framework that stores and manages data related to graphical and functional elements of a user interface (UI). A "user interface," for the purpose of this disclosure, is a means by which a user interact with a computing device, software, or application. In some embodiments, UI may include a plurality of visual elements. In some cases, exemplary embodiments of visual elements may include, without limitation, screens and windows (i.e., the main areas) where information is visually displayed and user interactions occur, buttons, icons, or other graphical elements that represent functions or actions that may be performed e.g., by clicking or tapping, menus and toolbars (i.e., structured lists of options or commands that users may select), text fields, labels, images, and the like.

With continued reference to FIGS. 1A-D, in some embodiments, UI may include one or more interactive controls. As non-limiting examples, UI may include mouse and keyboard inputs via traditional input devices e.g., mouse and keyboard, touch inputs (for input devices with touch-screens, allowing users to interact using gestures e.g., tapping, swiping, and pinching), voice command, among others. Changes in UI, for example, and without limitation, highlighting one or more visual elements, indicating that an action has been recognized may be carried out by manipulating one or more interactive controls. Additionally, or alternatively, any sounds (or alerts) as described herein may be used to, in some cases, inform the user about the success or failure of an action. Further, UI may implement physical sensations e.g., vibrations that provide haptic feedback to the user via one or more user devices.

Referring to FIG. 1A, apparatus is configured to populate user interface data structure 100a. "Populating," as described herein, refer to a process of configuring one or more visual elements and interactive controls within a UI. User interface data structure 100a is configured to present a plurality of selectable sound categories 104a-i. As used in this disclosure, a "sound category" is a classification or grouping of audio elements that shares common theme or contextual relevance. In an embodiment, plurality of sound categories 104a-i may be organized based on a plurality of themes 108a-e; for example, and without limitation, plurality of themes 108a-e may include "Dark," "Fantasy," "Natural," "Sci-Fi," "Seafaring," and the like.

With continued reference to FIG. 1A, plurality of sound categories 104a-i that are "selectable," for the purpose of this disclosure, means that each one of plurality of sound categories 104a-I can be chosen or activated by the user, for example, and without limitation, through one or more user inputs or actions. As a non-limiting example, each selectable sound category may respond to user inputs such as, without limitation, clicks, taps, or key presses. In some cases, each selectable sound category may be, or at least include an interactive control such as, without limitation, a button, checkboxes, radio button, icon, image, menu item, list entry, or the like. For instance, and without limitation, each selectable sound category may include at least a visual indicator e.g., a corresponding scene illustration that changes in saturation, in response to user selection, to show that the selectable sound category is selected (low saturation) or unselected (high saturation).

With continued reference to FIG. 1A, in an embodiment, each selectable sound category of plurality of selectable sound categories 104a-i may include a scene selection and an audio playback container associated with the scene selection. As used in this disclosure, a "scene selection" is a specific thematic or contextual choice that define an overall auditory environment. As used in this disclosure, a "audio playback container," also known as a "music playback container," is a modular, encapsulated set of audio assets and playback instructions designed to manage the delivery and manipulation of the contained set of audio assets for specific selectable sound categories. Said audio assets may include any configurable audio outputs as described herein. These audio assets may be pre-organized and managed as a cohesive unit during playback. One or more audio parameters as described in further detail below may be included in the music playback container configured to instruct apparatus on, for example, and without limitation, how to play the contained audio assets.

With continued reference to FIG. 1A, as a non-limiting example, each selectable sound category of plurality of selectable sound categories 104a-1 may include an organizing element configured to determine which audio assets (e.g., sound files, or audio configuration files) need to be included in associated audio playback container. In some cases, audio assets may be shared across different selectable sound categories. In some cases, selectable sound category may act as a setting for a plurality of audio playback containers using, for example, and without limitation, pre-determined configuration, to determine playback inclusion, volume, filter settings for plurality of configurable audio outputs, and the like as described in further detail below. For instance, and without limitation, selecting a "City" scene may call an audio playback container e.g., rain sound effect container to include certain audio assets e.g., "city rain" and exclude "forest rain." For another example, selecting a "Dungeon Corridors" scene may cause the rain sound effect container to play back same audio assets as if user had selected, but changes some audio parameter (e.g., filtering parameters) to make the rain sound different (more distant, muffled, and with more reverb).

With continued reference to FIG. 1A, in some cases, audio playback container may include a plurality of background noise. A "background noise," for the purpose of this disclosure, is a layer of audio that create the overall ambient environment of a scene. In some cases, scene selection may include a combination of layers of audio e.g., ambient sounds, environmental sounds, and any other relevant audio outputs that together create a cohesive auditory experience reflecting a particular setting or atmosphere. For instance, and without limitation, background noise may establish a primary auditory setting and serve as a baseline upon which additional sound effects and audio elements are added. In some cases, background noise as described herein may also include foreground noise (i.e., more prominent audio elements that demand the user attention e.g., character dialogue or main sound effects).

With continued reference to FIG. 1A, as a non-limiting example, plurality of selectable sound categories 104a-i, under theme "natural," may include a plurality of scene selections such as, without limitation, "The Artifact," "Unknown World," "Wilds," "Plains," "Forest," "Ancient Grove," "Mountains," "Haunted Swamp," and "Shipwreck Cove." A selection for a "Forest" may include background noise including one or more default ambient sounds, such as, without limitation, rustling leaves, chirping birds, distant water flows, and the like. When selected, event handlers associated with plurality of selectable sound categories 104a-i may trigger specific actions or changes within the system, for example, and without limitation, displaying new content (in some cases, using a new UI), output background noise, or executing other pre-defined commands. As a non-limiting example, selecting a sound category may display related configurable audio outputs and associated audio settings as described in further detail below.

Figure 1B:
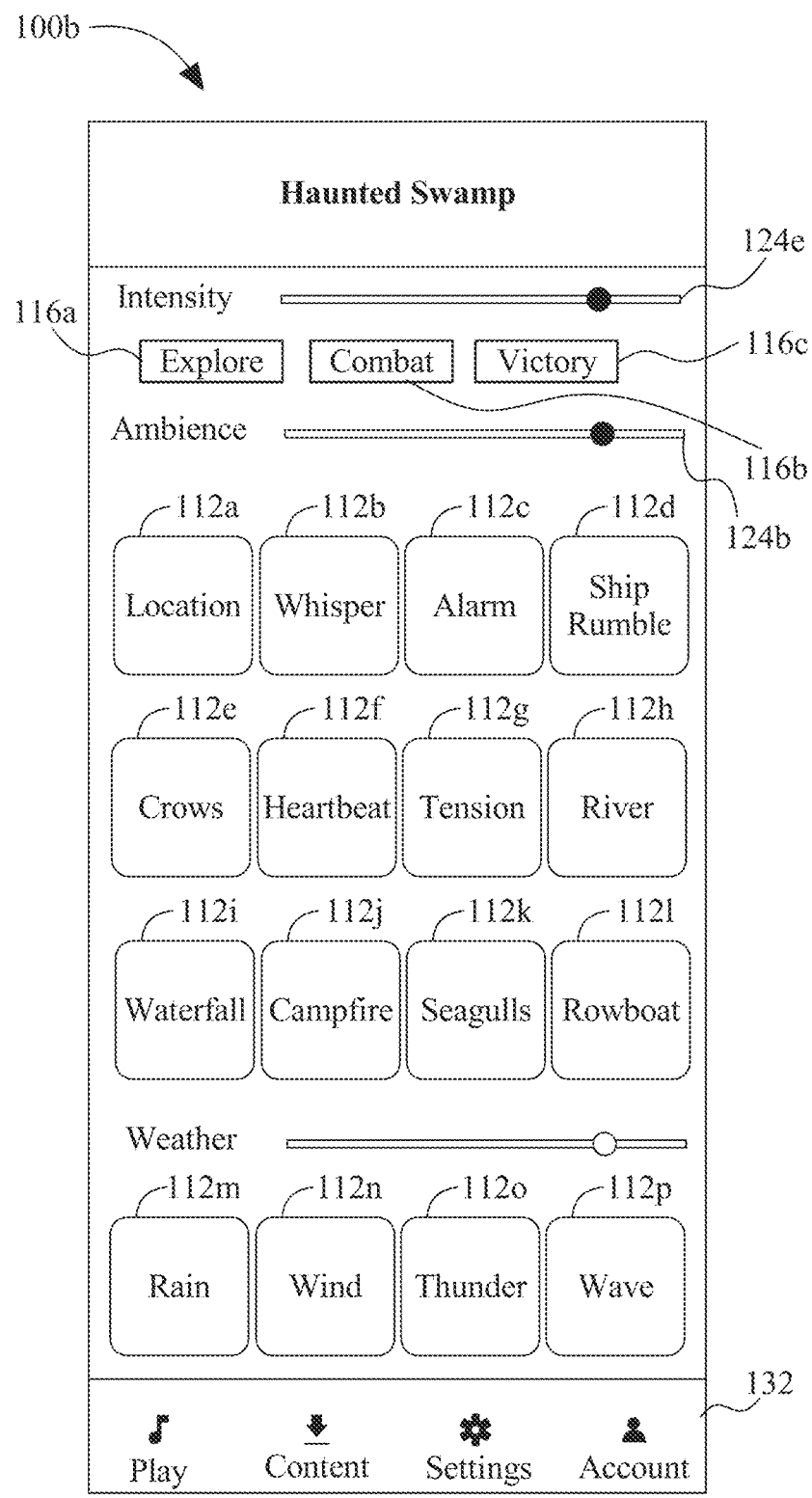

Now referring to FIG. 1B, populating user interface data structure 100b include generating a plurality of configurable audio outputs 112a-p for each selectable sound category of plurality of selectable sound categories 104a-i. As described herein, a "configurable audio outputs" is a sound element that can be adjusted and customized by user through UI data structure 100a-d. Each configurable audio output of plurality of configurable audio outputs 112a-p includes one or more audio parameters. "Audio parameters," for the purpose of this disclosure, are attributes that can be adjusted to control the characteristics and behavior of audio outputs. In some embodiments, plurality of configurable audio outputs 112a-p may include ambient sounds, sound effects, and other auditory components that can be tailored in terms of, for example, and without limitation, volume, intensity, duration, and any other audio parameters as described below to create a desired auditory experience. As a non-limiting example, each configurable audio output of plurality of configurable audio outputs 112a-p may be considered as a "music" (i.e., a structured and harmonious arrangement of sounds).

With continued reference to FIG. 1B, in some embodiments, plurality of configurable audio outputs 112a-p may include a wide range of sound elements. In some cases, each selectable sound category of plurality of selectable sound categories 104a-i may include a distinct set of configurable audio outputs; for instance, and without limitation, set of configurable audio outputs may include ambient sounds, weather elements, background noises, sound effects, and any other environmental audio signal related to the scene. In some cases, each configurable audio output of the plurality of configurable audio outputs 112a-p may include or be linked to one or more audio files. In some cases, one or more configurable audio outputs 112a-p may be shared between different selectable sound categories. For example, common audio outputs such as, without limitation, wind, train, footsteps, and/or the like may be utilized across multiple scenes.

With continued reference to FIG. 1B, an "audio signal," as used in this disclosure, is a representation of sound. In some cases, an audio signal may include an analog electrical signal of time-varying electrical potential. In some embodiments, an audio signal may be communicated (e.g., transmitted and/or received) by way of an electrically transmissive path (e.g., conductive wire), for instance an audio signal path. Alternatively, or additionally, audio signal may include a digital signal of time-varying digital numbers. Audio signals may represent frequencies within an audible range corresponding to ordinary limits of human hearing, for example substantially between about 20 and about 20,000 Hz.

With continued reference to FIG. 1B, in an embodiment, each configurable audio output of the plurality of configurable audio outputs 112a-b may include an environmental element selection and an environmental audio signal associated with the environmental element selection. As used in this disclosure, an "environmental element selection" is a specific choice within a scene that represent a distinct aspect of an environment. In some cases, environmental element selections may be grouped according to sound type. As a non-limiting example, natural sounds, such as, without limitation, sounds of wind, rain, thunder, wave, and the like grouped under "weather" sound type while man-made sounds, such as, without limitation, sounds of footsteps, machinery, and the like may be grouped under "ambience" sound type. An "environmental audio signal," for the purpose of this disclosure, is the audio output generated for the selected environmental element. In some cases, environmental audio signal may be configured based on, for example, and without limitation, one or more audio parameters associated with the corresponding environmental element selection.

Within continued reference to FIG. 1B, exemplary embodiments of plurality of configurable audio outputs 112a-p associated with selectable sound category, for example, a "haunted swamp" sound category 104h may include, without limitation, sounds of the location, whisper, alarm, ship rumble, crows, heartbeat, tension, river, waterfall, campfire, seagulls rowboat, among others. As a non-limiting example, environmental element selection may include rustling of leaves, distant cawing of crows, or eerie whispers of spirits, and associated environmental audio signal for the rustling leaves may include one or more specific audio characteristics that mimic the sound of leaves being disturbed by the wind, such as gentle cracking and soft, intermittent swishing sounds. Similarly, the crow's cawing may have a sharp, echoing quality to reflect their calls in a desolate swamp, and the whispers may be low and haunting.

With continued reference to FIG. 1B, additionally, or alternatively, plurality of configurable audio outputs 112a-p may include a set or a subset of default configurable audio outputs. Default configurable audio outputs may be, for example, and without limitation, a group of configurable audio outputs, such as, without limitation, sounds of location, crows, and river may be automatically activated once user has selected "haunted swamp" sound category 104h. In an embodiment, default configurable audio outputs may serve as a foundational soundscape that ensure a baseline level of environmental audio signal is always present. In some cases, apparatus may "memorize" configurable audio outputs user selected most frequently and mark them as default configurable audio outputs. In some cases, selected configurable audio outputs may be highlighted within UI data structure 100b to indicate, for example, at least in part, that they are currently active.

With continued reference to FIG. 1B, in a further embodiment, each selectable sound category of plurality of selectable sound categories 104a-i may include a multiple sets of configurable audio outputs. In some cases, configurable audio outputs may be organized into, for example, and without limitation, different tabs 116a-c within UI data structure 100b. As a non-limiting example, tabs 116a-c may categorize plurality of configurable audio outputs based on states, such as "exploration," "combat," "victory," and the like, allowing users to easily navigate plurality of audio outputs according to specific scenarios within the scene. In some cases, "explore" tab 116a may, for example, and without limitation, provide a first set of configurable audio outputs (e.g., sounds of location, whisper, alarm, ship rumble, crows, heartbeat, tension, river, waterfall, campfire, seagulls, rowboat, and the like) suitable for general exploration and navigation within selected "haunted swamp" sound category 104h, while "combat" and "victory" tabs 116b-c may include a second set of configurable audio outputs (e.g., sounds of clashing weapons, grunts, shouts, and the like) and a third set of configurable audio outputs (e.g., triumphant fanfare, clinking coins, cheering, and the like) suitable for combat and victory (or completion a significant event) in the "hunted swamp" sound category 104h respectively.

With continued reference to FIG. 1B, tabs 116a-c may be configured to dynamically control one or more music playback containers designed for each selectable sound categories. continuing the non-limiting example, "exploration," "combat," and "victory" tabs 116a-c may serve as triggers that initiate certain set of configurable audio outputs (e.g., playback of music and sound effects) specifically tailored to a plurality of selectable sound categories 104a-i. For instance, and without limitation, when a user select "exploration" tab 116a, apparatus may activate a music playback container that plays one or more configurable audio outputs such as, without limitation, ambient sounds, and music for general exploration, while "combat" tab 116b on the other hand, may trigger, once selected, the apparatus to active a different music playback container designed for a more intense and dynamic scenario.

With continued reference to FIG. 1B, in some cases, different music playback containers may overlap on each other. As a non-limiting example, one or more configurable audio outputs within each music playback container may be the same (e.g., identical ambient sounds or background music tracks). In other embodiments, when switching from one music playback container to another e.g., switching from "exploration" to "combat," or from "combat" to "victory," apparatus may be configured to intuitively manage the timing and shape of, for instance, and without limitation, crossfade based on current and upcoming audio parameters to ensure smooth transitions that enhance the user experience. This is described in further detail below with reference to FIG. 2.

Figure 1C:
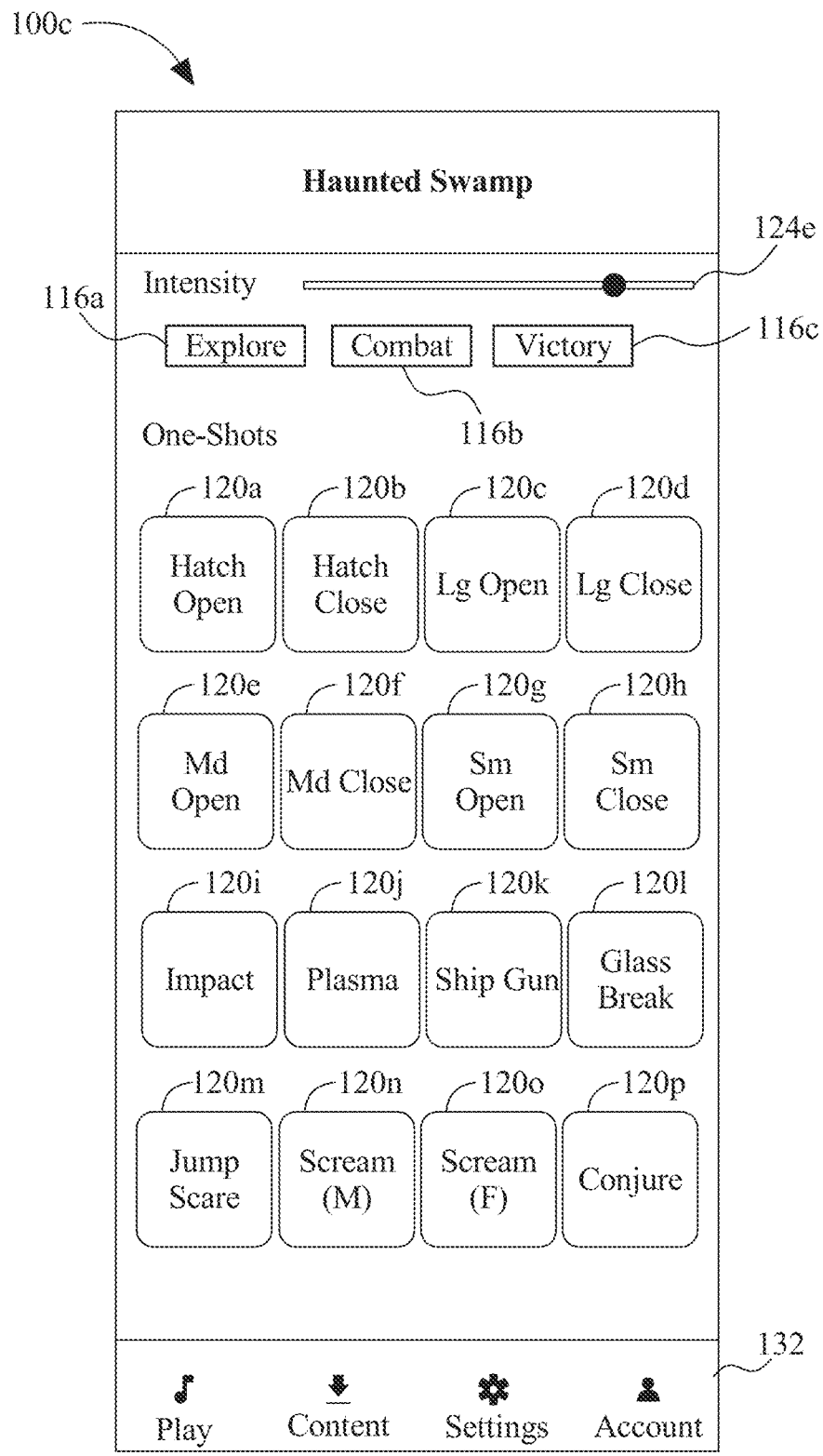

Now referring to FIG. 1C, in a non-limiting embodiment, user interface data structure 100c having plurality of configurable audio outputs may include one or more temporary configurable audio outputs 120a-p. As described herein, "temporary configurable audio outputs" are short, non-recurring audio elements. In some cases, temporary configurable audio outputs 120a-p may include at least an audio signal triggered by or selected based on at least a specific user-initiated event or a group of user-initiated events, wherein the at least an audio signal may be characterized by a pre-defined duration, generated in response to the at least a specific user-initiated event or the group of user-initiated events. A "user-initiated event," for the purpose of this disclosure, is any action or input performed by the user. User-initiated event may or may not trigger a response from apparatus. In some cases, exemplary embodiment of user-initiated event may include, without limitation, button press, mouse click, character action, environmental interaction, or the like.

With continued reference to FIG. 1C, temporary configurable audio outputs 120a-p may include a fixed duration (e.g., 1, 2, 3, 4, 5 seconds or more) and play, in some instances, for a specific amount of times (e.g., 1, 2, 3 times or more) before stopping. In some cases, duration may be predetermined and tailored to nature of the temporary configurable audio outputs. In some cases, each temporary configurable audio output may have different duration, number of times, or both. In some cases, user may be able to adjust the duration and number of times based on user preferences. For example, temporary configurable audio outputs 120a-p may include, without limitation, a plurality of "one-shot" audio outputs i.e., audio outputs that occur only once per trigger event. Plurality of "one-shot" audio outputs may be used to provide, for example, and without limitation, instant auditory cues or effects that correspond to user actions or specific events within the environment. Exemplary embodiments of temporary configurable audio outputs 120a-p may include, without limitation, sounds of hatch open, hatch close, large open, large close, medium open, medium close, small open, small close, impact, plasma, ship gun, glass break, jump scare, scream (male), scream (female), conjure, and the like. As a non-limiting example, when a character (controlled by a user) is in a combat, the sound of ship gun may be generated, triggered, or otherwise selected and played. In some cases, plurality of temporary configurable audio outputs may be organized into multiple tabs 116a-c as well.

With continued reference to FIG. 1C, in some cases, a single temporary configurable audio output may include a combination of a plurality of temporary audio elements. As a non-limiting example, a "conjure" temporary configurable audio output may include a multi-component audio output designed to create a sense of magical summoning, wherein the "conjure" sound effect may be composed of a plurality of distinct elements e.g. an ambient "bed" (time-stretched to last between 4.5-5.5 seconds) a "lead-up" sound (time-stretched to last between 1.5 and 2.5 second), and a "tail sound" (vary from 1 to 1.5 second). Each of these elements may be configurable, for instance, and without limitation, with variations in duration and random selection from a list of audio settings. "Conjure" temporary configurable audio output may include a mystical hum that set the scene for a magical event, randomly, a rising series of twinkling chimes start and conclude with a randomly chosen sparkling burst to signify a successful conjuring (total duration approximately 5.5-6.5 seconds). User triggering the conjure effect may expect a complete, self-contained auditory sequence that enhance the narrative or action without needing additional inputs to manage the effect, providing a more dynamic auditory experience.

Figure 1D:
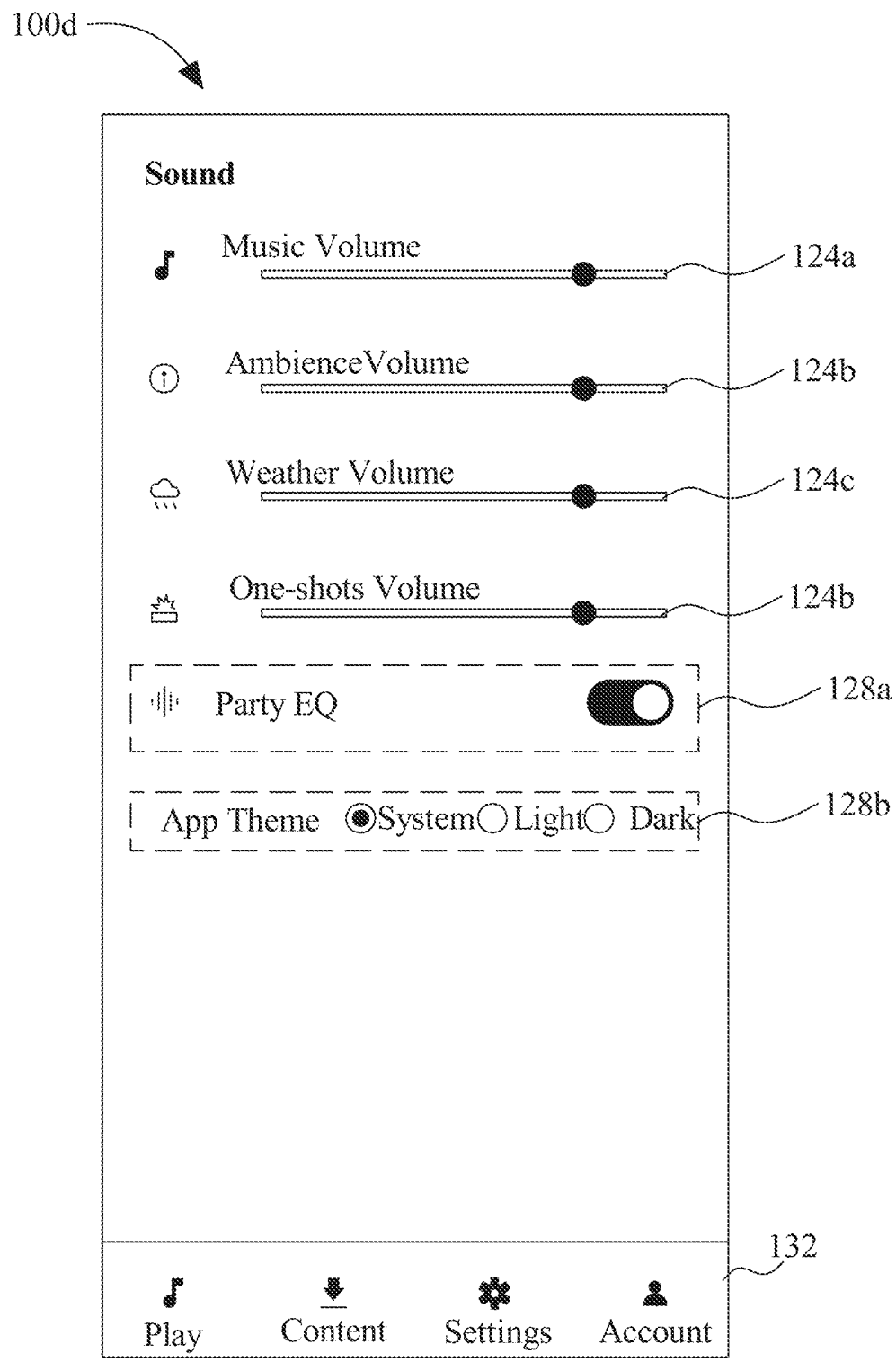

Now referring to FIG. 1D, populating UI data structure 100d includes initializing a plurality of audio settings 124a-e for plurality of configurable audio outputs 120a-p, wherein each audio setting of plurality of audio settings is linked to one or more audio parameters. As used in this disclosure, "audio settings" are configurations that can be adjusted to control one or more characteristics and behavior of plurality of configurable audio outputs 120a-p within the system. In some cases, plurality of audio settings 124a-e may allow user to customize the auditory experience by, for example, at least in part, modifying how different sound elements are played back (or generated or processed). As a non-limiting example, plurality of audio settings 124a-e may include volume settings such as music volume, ambience volume, weather volume, one-shots volume, and the like, each respectively linked to audio parameter e.g., the volume (the loudness, bypassing, or blending particular FX channels) of a set of aforementioned configurable audio outputs. Other audio settings, such as, without limitation, pitch settings, tempo settings, reverb settings, and/or the like may also be implemented in UI data structure 100d.

With continued reference to FIG. 1D, in one embodiment, each audio setting of plurality of audio settings 124a-e may be presented, for example, as an interactive slider on a setting page (i.e., UI data structure 100d). As described herein, an "interactive slider" is an interactive control that allow user to adjust a value (e.g., linked audio parameters) within a predefined range by dragging a visual element such as a handle or thumb along a linear track. As a non-limiting example, interactive slider may include a horizontal or, in other cases, a vertical track with a movable thumb that the user can virtually drag along the track, wherein the position of the movable thumb may represent a current value within a range, for instance, from 0 to 100. In some cases, as user moves the handle, apparatus may provide, for example, and without limitation, immediate visual and/or auditory feedback, reflecting the current value of the audio setting being adjusted.

With continued reference to FIG. 1D, alternatively, as shown in FIGS. 1B-C, interactive sliders may be accessed on separate dedicated page (i.e., UI data structure 100b-c), including corresponding configurable audio outputs associated with linked audio parameters. As a non-limiting example, as shown in FIG. 1B, on UI data structure 100b, a first audio setting e.g., ambience sound volume slider may be configured in a position in proximity to plurality of configurable audio outputs 120a-1 (e.g., location, whisper, alarm, ship rumble, crows, heartbeat, tension, river, waterfall, campfire, seagulls, and rowboat) and a second audio setting e.g., weather sound volume slider may be configured in a position in proximity to configurable audio outputs 120m-p (rain, wind, thunder, and wave) related to the ambiance of selected "haunted swamp" sound category 104h.

With continued reference to FIG. 1D, in some embodiments, plurality of audio settings 124a-e may include an intensity setting 124e (see FIGS. 1B-C). As described herein, an "intensity setting" is an audio setting that controls the strength, impact, or prominence of an audio output. Ins some cases, intensity setting 124e may allow users to adjust how powerful or subdued a selected configurable audio output or set of configurable audio outputs is perceived within the auditory environment. As a non-limiting example, intensity setting 124e may be linked to the intensity of configurable audio outputs. Adjusting the intensity may affect how dominant or subtle an audio output e.g., a sound is within the overall mix; for instance, and without limitation, a higher intensity level Intensity may make a sound more prominent and impactful, while a lower intensity level may make the sound softer and less noticeable.

With continued reference to FIG. 1D, in an embodiment, intensity setting 124e may influence the volume of various individual configurable audio output within music playback containers. In some cases, intensity setting 124e may not be linear; instead, it may utilize varying curves (e.g., volume response curves) to achieve a more nuanced effect. As a non-limiting example, one or more configurable audio outputs may have an inverse correlation with position of the intensity setting 124e, producing higher volumes at lower settings and vice versa. For instance, and without limitation, background music may have a gentle slope while foreground effects (e.g., footsteps or whispers) may exhibit a steeper curve. Subtle environmental audio signal (e.g., distant birds or rustling leaves) may increase in volume as the intensity decrease, while other loud and aggressive environmental audio signal (e.g., thunder or shouting) may become more prominent as intensity increase.

With continued reference to FIG. 1D, in another embodiment, intensity setting 124e may impact on filter cutoff frequency. In some cases, one or more filters may be used to shape the tonal quality of plurality of configurable audio outputs by allowing certain frequencies to pass though while attenuating others. As a non-limiting example, at lower intensity levels, cutoff frequencies of high-pass and low-pass filters may be set to allow more mid-range frequencies, creating a softer, more natural sound. Conversely, at higher intensity levels, filters may allow more extreme frequencies to pass through; thus, at least in part, enhance the clarity and impact of sharp, high-pitched sounds e.g., a "whistle" or deep, low-pitched sounds e.g., a "thunder."

With continued reference to FIG. 1D, in yet another embodiment, intensity setting 124e may additionally, or alternatively govern an inclusion or, in some cases, exclusion of specific configurable audio outputs within music playback containers as described above. In some cases, apparatus may initialize a random container designed to simulate one or more weather effects, certain configurable audio outputs such as, without limitation, lightning strikes or heavy rainfall may only be included if, and only if the intensity is above a pre-defined threshold. At lower intensity levels, these dramatic sounds may be excluded, leaving only gentler elements (e.g., light rain or distant thunder). This selective inclusion/exclusion may help to maintain a cohesive and contextually appropriate soundscape.

With continued reference to FIG. 1D, in some cases, intensity setting 124e may include, for example, an intensity slider, as shown in FIG. 1B, placed above tabs 116a-c, and in FIG. 1C, placed in proximity to temporary configurable audio outputs 120a-b (e.g., hatch open, hatch close, large open, large close, medium open, medium close, small open, small close, impact, plasma, ship gun, glass break, jump scare, male scream, female scream, and conjure). Other interactive controls such as, without limitation, dials or numerical input fields may be used for plurality of audio settings 124a-e as described herein. In other cases, intensity setting 124e may be applied, for example, and without limitation, to all configurable audio outputs including all ambience sounds, background noise, and environmental audio signals as described above; for instance, and without limitation, the intensity of rain sounds, the power of an explosion effect, the prominence of background music may all be controlled either simultaneously or separately through intensity setting 124e.

With continued reference to FIG. 1D, UI data structure 100d may further include one or more system settings 128a-d. "System settings," for the purpose of this disclosure, are configuration parameter that governs the overall behavior, appearance, or functionality of the system. In an embodiment, apparatus as described herein may implement a "Party EQ" feature, an advanced equalization tool configured to optimize audio output for social gatherings, events, or any settings where a plurality of users or players involved, and a dynamic sound output is desired. In some cases, Party EQ may allow users, for example, at least in part, to manually adjust and fine-tune the frequency balance of the audio to enhance the auditory experience. In some cases, such adjustment and fine-tuning may be automatic, for example, and without limitation, apparatus may be configured to dynamically modify the frequency balance based on environmental noises, making the overall mix ideal for creating an engaging and immersive atmosphere at parties.

With continued reference to FIG. 1D, in some embodiments, party EQ may allow user or system to manipulate, in some instances, audio parameters e.g., frequency bands, such as without limitation, bass, midrange, treble, and the like. For example, and without limitation, user may boost or cut specific frequencies to enhance clarity, impact, and overall quality of a subset of configurable audio outputs of plurality of configurable audio outputs. As a non-limiting example, apparatus may, once party EQ system setting is enabled, dynamically adjust the equalization settings of plurality of configurable audio outputs in real-time or near real-time, based on one or more configurable audio outputs being selected and played, and acoustic characteristics (e.g., environmental noises) of the room. For instance, apparatus may automatically detect ambient sound levels and characteristics in the surrounding environment and adjust the audio settings accordingly to maintain a desired sound quality and clarity. In a nosy environment, for example, apparatus may enhance the mid and high frequencies of plurality of configurable audio outputs to ensure that the speech and important audio cues remain clear and intelligible.

With continued reference to FIG. 1D, in some cases, system settings may be adjusted via interactive controls, for example, and without limitation, UI data structure 100d may include one or more toggle switches allow users to activate or deactivate specific feature, such as, without limitation, party EQ feature or other relevant settings with an on/off mechanism. As a non-limiting example, for the party EQ system setting 128a, a toggle switch may enable user to quickly turn the feature on or off. When Party EQ is activated, apparatus may enhance audio output for social gatherings with preset, customizable, or otherwise dynamic EQ settings. When deactivated, audio outputs may return to their default configurations. Additionally, or alternatively, other interactive controls such as, without limitation, radio inputs (also known as radio buttons) may be displayed, allowing user to select one option from a predefined set of options. Only one radio button in the group may be selected at a time. As a non-limiting example, a radio input may be used to select the app theme (i.e., system setting 128b) User may choose, in some instances, between different (color or appearance) themes such as, without limitation, "Light," "Dark," and "System." In some cases, selecting one theme may automatically deselect the others or previously chosen one. In some cases, the selected theme may be immediately applied to UI data structure 100a-d as described herein.

With continued reference to FIGS. 1A-D, UI data structure 100a-d may further include a menu 132 containing a list of options such as, for example, and without limitation, "play," "content," "settings," and "account." In some cases, menu 132 may allow user to select one option at a time. Selecting one option in menu 132 may automatically deselect previous selected option. Menu 132 may be displayed, for instance, as a menu bar positioned horizontally across the bottom of the UI. In some cases, menu bar may be located on the top of the UI, such as, without limitation, a pull-down menu.

With continued reference to FIGS. 1A-D, "play" menu option may allow user to start or resume an audio experience or interaction including, without limitation, a selectable sound category (i.e., scene), playing a playlist, engaging with any interactive audio content, and the like. In one or more embodiments, event handler binding the "play" menu option may be triggered, upon a click or a tap, configuring the UI to present user with, for example, and without limitation, a second list of options to choose specific selectable sound category and configurable audio outputs.

With continued reference to FIGS. 1A-D, "content" menu option may provide user access to a library or a repository of audio elements e.g., plurality of sound categories and configurable audio outputs, and any combination thereof. In some embodiments, user may browse through different sound categories or themes, and in some cases, search for one or more specific audio elements. In some cases, user may preview selected sound category (e.g., description) or customizing their soundscapes by, for example, and without limitation, selecting and adding desired configurable audio outputs to current configuration.

With continued reference to FIGS. 1A-D, "setting" menu option may allow user to adjust one or more audio settings including, without limitation, volume, pitch, tempo, reverb, party EQ, app theme, and the like as described above, and other system preferences. In some embodiments, interactive controls such as, without limitation, sliders, toggles, radio inputs, and the like may be implemented and displayed to fine-tune one or more configurable audio outputs and, in some cases, overall system behavior.

With continued reference to FIGS. 1A-D, "account" menu option may provide one or more user-specific or user-oriented options, for example, and without limitation, options related to a user profile containing one or more user preferences. As a non-limiting example, user-specific or user-oriented options may include options managing account details, accessing subscription information, configuring personalized settings, among others. In one or more embodiments, event handlers binding the "account" menu option may allow user to update user profile e.g., manage subscriptions or licenses and set user preferences that affect user experience across sessions.

Figure 2:
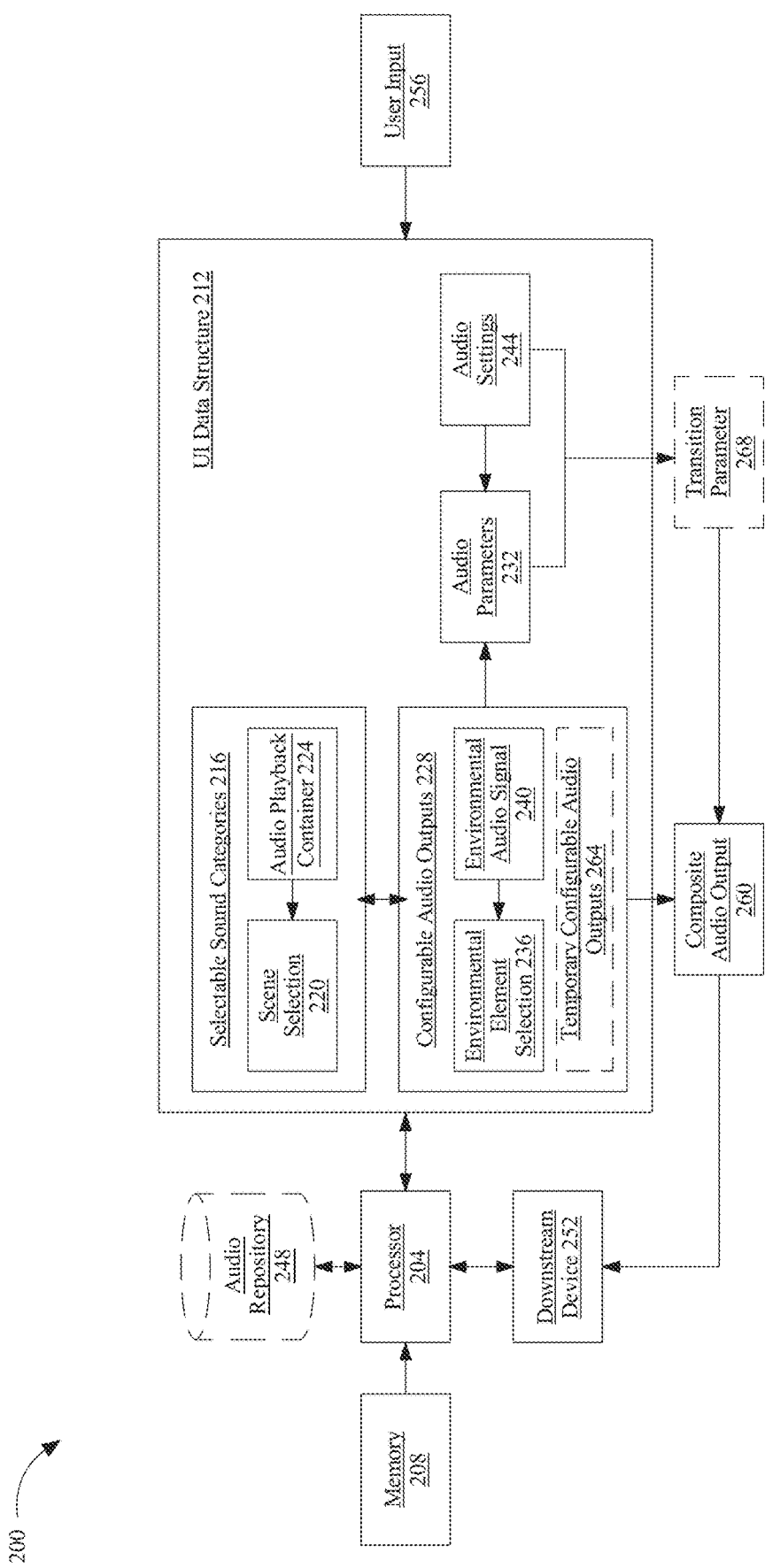
FIG. 2 is a block diagram illustrating an apparatus for providing a customizable and interactive ambient sound experience.

Now referring to FIG. 2, an exemplary embodiment of an apparatus 200 for providing a customizable and interactive ambient sound experience is illustrated. Apparatus 200 includes a processor 204. Processor 204 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 204 may include a single computing device operating independently, or may include two or more computing device operating in concert, in parallel, sequentially or the like; two or more computing devices may be included together in a single computing device or in two or more computing devices. Processor 204 may interface or communicate with one or more additional devices as described below in further detail via a network interface device. Network interface device may be utilized for connecting processor 204 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 204 may include but is not limited to, for example, a computing device or cluster of computing devices in a first location and a second computing device or cluster of computing devices in a second location. Processor 204 may include one or more computing devices dedicated to data storage, security, distribution of traffic for load balancing, and the like. Processor 204 may distribute one or more computing tasks as described below across a plurality of computing devices of computing device, which may operate in parallel, in series, redundantly, or in any other manner used for distribution of tasks or memory between computing devices. Processor 204 may be implemented using a "shared nothing" architecture in which data is cached at the worker, in an embodiment, this may enable scalability of apparatus 200 and/or computing device.

With continued reference to FIG. 2, processor 204 may be designed and/or configured to perform any method, method step, or sequence of method steps in any embodiment described in this disclosure, in any order and with any degree of repetition. For instance, processor 204 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 204 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 2, apparatus 200 includes a memory 208. Memory 208 is communicatively connected to processor 204. Memory may contain instructions configuring processor 204 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus 200, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 2, processor 204 is configured to populate a UI data structure 212 configured to present a plurality of selectable sound categories 216. UI data structure 212 may include any UI data structure as described above with reference to FIGS. 1A-D. Each selectable sound category of plurality of selectable sound categories 216 may include a scene selection 220 and an audio playback container 224 associated with the scene selection. Audio playback container 224 may include a plurality of background noise as described above. In some embodiments, audio playback container 224 may be continuously rendered in a procedurally determined manner. As described herein, a "procedurally determined manner" is a method of generating and playing back audio outputs in which the selection and timing of sounds are governed by a set of predefined rules and algorithms. As a non-limiting example, processor 204 may be configured to initialize an audio playback container having one or more configurable audio outputs that are randomly selected from a database (or a larger set of configurable audio outputs) based on pre-defined probabilities and rules which defines, in some cases, how often audio outputs are played, the range of intervals between audio outputs, and any other conditions that must be met for an audio output to be selected. Said continuous determined manner may therefore ensure that the background noise or other configurable audio outputs may be continuously rendered, and such continuous playback may persist until a subsequent user input modifies scene selection 220, triggering, for example and without limitation, a new set of procedural rules and configurable audio outputs.

With continued reference to FIG. 2, in other embodiments, audio playback container 224 may be continuously rendered in a cyclic manner. As described herein, a "cyclic manner" is a process of repeatedly playing a segment of an audio signal in a loop. In some cases, configurable audio output e.g., background noise continuously rendered in cyclic manner may include no noticeable breaks or interruptions between repetitions. Such continuous looping may create, for example, and without limitation, a consistent and immersive auditory backdrop that enhances the user experience. In an embodiment, playback may persist until user select a new selectable sound category and/or configurable audio outputs, adjusting specific audio settings, or the like) modifies scene selection 220. audio playback container 224 may remain active and provide stable auditory environment until, for example, the user chooses to change it. As a non-limiting example, "haunted swamp" sound category may include a background noise containing a combination of ambient sounds such as rustling leaves, distant howls, and soft murmur of water. If user switch to a different selectable sound category e.g., "plain" sound category, audio playback container 224 may be seamlessly transition to a new audio playback container (e.g., a new combination of ambient sounds) containing another set of configurable audio outputs, such as, without limitation, gentle breezes, birds chirping, and distant waterfalls, which will then persist in a cyclic manner until a further user input is received. In other cases, new combination of ambient sounds may be subsequently added into audio playback container 224.

With continued reference to FIG. 2, populating UI data structure 212 include generating, by processor 204, a plurality of configurable audio outputs 228 for each selectable sound category of plurality of selectable sound categories 216, wherein each configurable audio output of the plurality of configurable audio outputs 228 contains one or more audio parameters 232. In an embodiment, each configurable audio output of plurality of configurable audio outputs 228 may include an environmental element selection 236 and an environmental audio signal 240 associated with the environmental element selection 236. In some cases, and similar to background noises, one or more environmental audio signal 240 may be configured to be rendered continuously, by processor 204, in a procedurally determined manner as described above. Once selected, one or more environmental audio signal 240 may be added into audio playback container 224. Processor 204 is then configured to initialize a plurality of audio settings 244 for plurality of configurable audio outputs 228, wherein each audio setting of the plurality of audio settings 244 is linked to the one or more audio parameters. As a non-limiting example, a volume setting may be connected to a volume parameter of plurality of configurable audio outputs 228, allowing user to adjust the loudness of the outputs. Similarly, a pitch setting may be linked to a pitch parameter controlling the frequency characteristics of each one of plurality of configurable audio outputs 228. Processor 204 then populates UI data structure 212 as a function of plurality of configurable audio outputs 228 and plurality of audio settings 244. This may be implemented, without limitation, as described above with reference to FIGS. 1A-D.

With continued reference to FIG. 2, in one or more embodiments, processor 204 may create one or more data structure that define one or more relationships between plurality of audio settings 244 and plurality of audio parameters 232. Processor 204 may associate, for example, and without limitation, each user control (i.e., audio setting) with a set of audio parameters it modifies. This may involve, in some cases, defining a permissible range of values for each setting, which may directly or indirectly correspond to a range of the linked parameters. As a non-limiting example, a volume slider may range from 0-100 which may correspond to a parameter value of 0% to 100% volume. In some cases, processor 204 may set an initial default value for each audio parameter based on, for instance, and without limitation, typical or recommended settings or user preferred settings for one or more configurable audio outputs of plurality of configurable audio outputs 228.

With continued reference to FIG. 2, in some cases, when user adjust one or more audio setting through a user interface, linked audio parameters 232 may be updated in real-time or near real-time. In one embodiment, processor 204 may capture, for example, and user input and processor 204 may translate the user input into one or more parameter changes that alter one or more corresponding configurable audio outputs. As a non-limiting example, if a user increase the volume setting via a slider, event handler of the slider may configure processor 204 to update a volume parameter, resulting in a louder sound output of background noise and one or more configurable audio outputs that are currently playing in cyclic manner. Apparatus 200 may provide immediate feedback to user by rendering the adjusted background noise and one or more configurable audio outputs in real-time, allowing users to hear the effect of their changes instantly.

With continued reference to FIG. 2, plurality of selectable sound categories 216 including each scene selection 220 and each associated audio playback container 224, plurality of configurable audio outputs 228 including each environmental element selection 236 and associated environmental audio signal 240, plurality of audio settings 244, and any relevant data thereof may be stored in, or in other cases, retrieved from, an audio repository 248. As used in this disclosure, an "audio repository" is a centralized storage system that holds and manages all audio-related data and resources of the system. As a non-limiting example, audio repository 248 may include a database. For the purposes of this disclosure, a "database" is an organized collection of data, or a type of data store based on the use of a database management system (DBMS), the software that interacts with end users, applications, and the database itself to capture and analyze the data. Database may be implemented, without limitation, as a relational database, a key-value retrieval database such as a NoSQL database, or any other format or structure for use as database that a person of ordinary skill in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described in this disclosure. Data entries in database may be flagged with or linked to one or more additional elements of information, which may be reflected in data entry cells and/or in linked tables such as tables related by one or more indices in database or another relational database. A person of ordinary skill in the art, upon reviewing the entirety of this disclosure, will be aware of various ways in which data entries in database may store, retrieve, organize, and/or reflect data and/or records as used herein, as well as categories and/or populations of data consistently with this disclosure.

With continued reference to FIG. 2, processor 204 is configured to transmit populated UI data structure 212 to a downstream device 252. As used in this disclosure, a "downstream device" is any external device or system that receives data from a primary processing unit e.g., processor 204 and is capable of rendering, displaying, and/or further processing the received data. Exemplary embodiments of downstream device 252 may include, without limitation, user devices such as mobile devices, tablets, laptops, desktops, gaming consoles, speakers, and the like. Processor 204 may compile UI data structure 212 encapsulating plurality of configurable audio outputs 228 and audio settings 244 into a format suitable for transmission. As a non-limiting example, processor 204 may serialize UI data structure 212 into a standardized data interchange format, such as a JSON or XML file. Data transmission may be carried out, for example, and without limitation, using one or more communication protocols appropriate for downstream device 252. Exemplary communication protocols may include, without limitation, HTTP/HTTPS, TCP, UDP, FTP, SMTP, SFTP, and the like via internet. Processor 204 may establish a secure communication channel with downstream device 252 using a selected communication protocol. In some cases, UI data structure 212 may be transmitted via Bluetooth if downstream device 252 e.g., mobile phone or tablet is near by or via Wi-Fi if devices are connected to a same local network. Once downstream device 252 receive the transmitted data, it may deserialize it back into UI data structure 212 format.

With continued reference to FIG. 2, in an embodiment, downstream device 252 may include a display device. A "display device," for the purpose of this disclosure, is a device that is used to display a plurality of data and other digital content. In some cases, display device may include any user interface as described above e.g., a graphical user interface (GUI). Other exemplary embodiments of user interface may include, without limitation, a command line interface (CLI), a menu-driven user interface, a touch user interface, a voice user interface (VUI), a form-based user interface, any combination thereof, and the like. Processor 204 may display, at display device, UI data structure 212 using GUI. This may include, without limitation, displaying plurality of selectable sound categories 216, configurable audio outputs 228, associated audio parameters 232, audio settings 244, and the like, and allowing one or more user interaction with displayed digital content; for instance, and without limitation, adjusting one or more audio settings as described below.

With continued reference to FIG. 2, processor 204 is configured to adjust, in response to at least a user input 256 targeting a first set of configurable audio outputs of the plurality of configurable audio outputs 228 associated with a first selectable sound category of plurality of selectable sound categories 216, at least one audio setting of plurality of audio settings 244 to modify audio parameters 232 linked to the first set of configurable audio outputs. As used in this disclosure, a "user input" refers to any action performed by a user to interact with the system which is detected and processed by processor 204 to execute a corresponding function. Exemplary user input 256 include, without limitation, tactile, auditory, visual interactions, and the like depending on the type of user interface and downstream device available. As non-limiting examples, at least a user input 256 may include a touch input (e.g., tapping, swiping, pinching, or dragging on a touchscreen or touchpad), mouse input (e.g., clicking, double-clicking, right clicking, dragging with a mouse), keyboard input (e.g., pressing a key, a combination, or a group of keys on a keyboard), voice input (e.g., spoken commands captured through a microphone communicatively connected to processor 204 and processed by voice recognition techniques), among others.

With continued reference to FIG. 2, As a non-limiting example, processor 204 may continuously, or periodically listen for one or more user inputs, which may be any form of aforementioned interactions. In some cases, user inputs may target a single, or a set of configurable audio outputs associated with a same selectable sound category (i.e., scene). For example, and without limitation, a user may drag a volume slider (touch input) on touchscreen interface on user's mobile device to adjust sound level of one or more ambient noises (e.g., location, crows, and river) in "haunted swamp" sound category. Processor 204 may modify, for instance, increase or decrease volume parameter corresponds to targeted configurable audio outputs according to user input, such as without limitation, a direction of the movement of volume slider's thumb controlled by the user.

With continued reference to FIG. 2, in cases wherein multiple set of configurable audio outputs are selected, or a second selectable sound category is selected, processor 204 may be configured to manage a smooth transition, ensuring an uninterrupted and cohesive auditory experience. Processor 204 may translate user input 256 selecting another set of configurable audio outputs or switching to a second selectable sound category of plurality of selectable sound categories 216 into a set of instructions identifying currently playing or active configurable audio outputs and background noises and their audio parameters and mapping identified audio parameters of the currently active outputs to newly selected configurable audio outputs associated with the same or a new selectable sound category. In some cases, audio parameter mapping may include identifying one or more similarities and/or differences in audio parameters e.g., volume, pitch, tempo, reverb, and the like. Additionally, or alternatively, audio parameters 232 may also include audio file selection (e.g., determining audio file inclusion or exclusion from audio playback container), time intervals (e.g., frequency of repetitively triggered elements, transition times, delay times, and the like), filtering adjustments (e.g., cutoff frequency, bandwidth, bypass, and the like), and convolution/resynthesis parameters (e.g., FFT bucket size, phase, amplitude, and the like). In some cases, processor 204 may also identify overlapping audio outputs between the current and new selections to determine, for example, and without limitation, if they need blending or otherwise replacements. As a non-limiting example, user may transition from a "haunted swamp" to a "plain." Current active configurable audio outputs may include rustling leaves and distant howls from "haunted swamp." The volume of rustling leaves and distant howls may begin to fade out while "plain" sounds such as, without limitation, birds chirping, and gentle breeze may start to fade in. This may involve aligning, by processor 204, sound's natural breaks as described in further detail below for a seamless transition.

With continued reference to FIG. 2, in a non-limiting embodiment, adjustment may be optimized using a machine learning model trained to predict user preferences and environmental contexts. Apparatus 200 may be configured to collect data on user interactions, preferences, environmental contexts; for instance, and without limitation, data may include user-adjusted audio settings, frequently selected sound categories, specific user inputs for various scenarios, and the like. Processor 204 may be configured to extract relevant features, for example, and without limitation, user demographics, time of day, types of audio outputs preferred, environmental noise levels, patterns in user adjustments or audio outputs, and the like from collected data, and generate a machine learning model based on one or more appropriate machine learning algorithms such as, without limitation, neural network, decision tree, support vector machines (SVM), among others. Machine learning model may be trained using training data, for example, and without limitation, historical data where the machine learning model may learn correlations between, for example, and without limitation, user inputs, environmental contexts, and optimal audio settings. In some cases, training data may be received from audio repository 248 or other databases, or provided by users. In some cases, processor 204 may dynamically adjust one or more audio parameters 232 based on machine learning model's prediction. For example, and without limitation, if the model predicts that the user prefers a higher bass level for a specific selectable sound category, apparatus 200 may automatically increases the bass in configurable audio outputs in other similar selectable sound categories. Additionally, or alternatively, once party EQ is enabled, apparatus 200 may adapt to changes in the environment (and user preferences) in real-time or near real-time. As a non-limiting example, if the environmental noise level increases, machine learning model may recommend increasing the volume or enhancing frequencies of certain active configurable audio outputs to ensure clarity.

With continued reference to FIG. 2, processor 204 is configured to output, at downstream device 252, first set of configurable audio outputs. In one or more embodiments, downstream device 252 may include a speaker or any other audio output devices. Processor 204 may transmit adjusted first set of configurable audio outputs and associated metadata to one or more speakers, headphones, smart audio devices, home theater systems, and/or the like. In some cases, this may include converting digital audio signals into a format suitable for playback. In some cases, a digital audio signal may be packaged (e.g., using codecs e.g., AAC, MP3, or WAV) and communicated (e.g., transmitted and/or received) by way of any of an optical fiber, at least an electrically transmissive path, and the like. In some cases, a line code and/or a communication protocol may be used to aid in communication of a digital audio signal. Exemplary digital audio transports include, without limitation, Alesis Digital Audio Tape (ADAT), Tascam Digital Interface (TDIF), Toshiba Link (TOSLINK), Sony/Philips Digital Interface (S/PDIF), Audio Engineering Society standard 3 (AES3), Multichannel Audio Digital Interface (MADI), Musical Instrument Digital Interface (MIDI), audio over Ethernet, and audio over IP. Once digital audio signal is received, downstream device 252 may decode and play back, for example, and without limitation, adjusted first set of configurable audio outputs including audio elements selected by user and adjusted according to specified audio settings and parameters. In some cases, if user make further adjustments to one or more audio settings via user interface of display device, processor 204 may dynamically updates the audio outputs in real-time or near real-time.

With continued reference to FIG. 2, outputting first set of configurable audio outputs include overlaying, by processor 204, first set of configurable audio outputs with a second set of configurable audio outputs to create a composite audio output 260. As used in this disclosure, a "composite audio output" is an audio signal that results from a combination of multiple individual audio elements or outputs. In an embodiment, composite audio output 260 may include a cohesive and synchronized mix of ambient sounds, sound effects, background noise, and/or any other audio signals. As a non-limiting example, first set of configurable audio outputs may include a plurality of initial audio elements selected and configured by the user (or by the system) while second set of configurable audio outputs may include, in some cases, additional audio elements that are overlaid with the plurality of initial audio elements to enhance an overall auditory experience. Such second set of configurable audio outputs may include, without limitation, a plurality of temporary configurable audio outputs 264 (e.g., one-shot sound effects), or in other cases, secondary audio elements (e.g., one or more configurable audio elements subsequently selected by the user or the system).

With continued reference to FIG. 2, in an embodiment, overlaying first set of configurable audio outputs with second set of configurable audio outputs to create a composite audio output may include synchronizing the timing (and alignment), for each configurable audio outputs of second set of configurable audio outputs with first set of configurable audio outputs. In another embodiment, overlaying first set of configurable audio outputs with second set of configurable audio outputs may include applying one or more audio processing techniques such as, without limitation, equalization, compression, and reverb to blend plurality of configurable audio outputs and background noise seamlessly. In yet another embodiment, overlaying first set of configurable audio outputs with second set of configurable audio outputs may include adjusting one or more audio parameters 232 of each set dynamically based on one or more predefined rules or real-time user inputs. In yet another embodiment, overlaying first set of configurable audio outputs with second set of configurable audio outputs may include prioritizing or ranking plurality of configurable audio outputs 228 based on an importance or relevance (calculated based on the game context, environmental noises, user/player characteristics, and/or the like) and adjusting, for example, and without limitation, volume levels and prominence of audio outputs accordingly.

With continued reference to FIG. 2, as a non-limiting example, processor 204 may be configured to determining a transition parameter 268, for first set of configurable audio outputs and second set of configurable audio outputs, based on respective audio parameters 232. As used in this disclosure, a "transition parameter" is a specific attribute or set of attributes used to determine certain degree of smoothness and effectiveness of a transition between different sets of audio outputs. In some cases, transition parameter 268 may be derived, for example, at least in part, from audio parameters 232 associated with the two set of both set of audio outputs such as, without limitation, volume level, frequency ranges, tempo, pitch, spatial positioning, and/or the like. As a non-limiting example, a volume difference between a first configurable audio output and a second configurable audio output may be a transition parameter 268. In an embodiment, processor 204 may calculate or determine transition parameter 268 by, for instance, and without limitation, analyzing the audio parameters of a current (first set) and an upcoming (second set) audio outputs. Calculation of transition parameter 268 may include calculating an average amplitude or spectral content and determining, for example, an algorithm to blend the current and the upcoming audio outputs.

With continued reference to FIG. 2, and continuing with the non-limiting example, processor 204 may be configured to select, as a function of transition parameter 268, a transition effect from a plurality of transition effects 272. As described herein, a "transition effect," for the purpose of this disclosure, is an audio processing technique or algorithm applied to create a seamless transition between different sets of audio elements. A change from one set of audio outputs to another may be considered "seamless" if the change is performed in a manner that is smooth, continuous, and free of perceptible disruptions or artifacts. Plurality of transition effects 272 may be stored in audio repository 248 as described above. In some cases, transition parameter 268 may be contextually relevant to ensure selected transition effect matches, for example, the nature of audio elements involved. Exemplary transition effects 272 may include, without limitation, crossfades, fades in/out, equalization adjustments, reverb changes, spatial audio transitions, among others. For example, a crossfade transition effect may gradually decrease the volume of one or more configurable audio output within first set of configurable audio outputs while increasing the volume of one or more configurable audio outputs within second set of configurable audio outputs.

With continued reference to FIG. 2, and continuing with the non-limiting example, processor 204 may select, for example, a slow crossfade transition effect based on transition parameters indicating a large volume difference. In some cases, once one or more transition effects of plurality of transition effects 272 are selected, processor 204 may apply the selected transition effect to both set of configurable audio outputs to execute the transition; for instance, and without limitation, processor 204 may apply a reverb transition effect to move from dry to a wet sound environment gradually. In some cases, applying transition effect to audio outputs may include generating a transitional audio effect based on transition parameter 268 and selected transition effect, wherein the "transitional audio effect," for the purpose of this disclosure, is a special audio element designed to facilitate an auditory transition between different audio outputs. For example, and without limitation, overlaying first set of configurable audio outputs with second set of configurable audio outputs to create composite audio output 260 may include introduce transitional audio effects such as ambiance bridges (e.g., gentle sounds e.g., wind, water flow, soft musical tones that blend with both set of audio outputs), cinematic swells (e.g., crescendos or decrescendos that lead into or out of a major audio output shift for instance when switching between sound categories), and overlapped audio elements (that gradually decrease the volume of a first audio output while increasing the volume of a second audio output or vice versa). Composite audio output 260 is then outputted, by processor 204, using downstream device 252 such as an audio output device e.g., an external speaker. In some cases, transition parameter 268 and transition effect 272 may be determined and transitional audio effect may be generated, using one or more machine learning models as described below.

With continued reference to FIG. 2, in some cases, a majority of the transition between different sets of configurable audio outputs may be managed using a single transition effect (e.g., crossfade). Creating composite audio output 260 may include determining a transition parameter 268 e.g., crossfade duration, crossfade shape, and one or more sync points, for first set of configurable audio outputs and second set of configurable audio outputs, based on respective audio parameters and overlaying first set of configurable audio outputs with second set of configurable audio outputs as a function of the transition parameters. As a non-limiting example, processor 104 may determine how long crossfade lasts between two set of configurable audio outputs, ensuing the transition does not happen abruptly thereby preventing any jarring changes in the audio environment with or without additional transition segments. Short crossfade may be applied for quick transition (e.g., moving from a music playback container for a clam exploration scene to another music playback container for an intense combat scenario. In some cases, short crossfade may last only a few seconds. One or more configurable audio outputs within second set of configurable audio outputs may quickly take over without leaving a noticeable gap during short crossfade. In other cases, long crossfade may be used for more gradual transitions e.g., shifting from combat back to a peaceful exploration state, allowing intense combat configurable audio outputs within first set of configurable audio outputs to slowly fade out while the ambient exploration sounds within second set of configurable audio outputs fade in.

With continued reference to FIG. 2, in some cases, processor 104 may also determine how audio parameter 232 e.g., audio levels change over the duration of crossfade (i.e., crossfade shape). Different shapes may create different auditory effects, for example, and without limitation, crossfade shape may include a linear crossfade which provides a consistent, even transition where the volume of the outgoing audio outputs decreases linearly while the volume of the incoming audio outputs increases linearly. For another example, without limitation, crossfade shape may include a logarithmic crossfade, wherein the logarithmic crossfade may create a more gradual change at the start and the end of crossfade. For a further example, without limitation, crossfade shape may include an exponential crossfaded which offers a rapid change at the beginning or end of the transition that is useful for dramatic shifts in the audio environment such as a sudden jump from quiet exploration to an intense action sequence.

With continued reference to FIG. 2, at least a sync point (i.e., a marker within an audio track that determine an optimal spot to align transitions) may be identified, by processor 104, based on one or more audio parameters linked to outgoing configurable audio outputs (e.g., first set of configurable audio outputs) and one or more audio parameters linked to incoming configurable audio outputs (e.g., second set of configurable audio outputs). In an embodiment, at least a sync point may ensure that the changes occur at musically or contextually appropriate timestamp. As a non-limiting example, processor 104 may be configured to identify one or more cue points in combined (first and second) set of configurable audio outputs. In such embodiment, cue points may include start of beat or a natural pause. Processor 104 may analyze cue points to determine suitable times for when crossfade begins and ends. In some embodiments, at least a sync point may be used to, for example, and without limitation, align the timing of the outgoing and incoming configurable audio outputs. Configurable audio outputs within second set of configurable audio outputs may start at a musically relevant point, preventing any disjointed or abrupt changes.

With continued reference to FIG. 2, however, it should be noted that transition techniques described herein may not be applied when determining, in some cases, how to play back composite audio output 260 containing non-musical elements e.g., temporary configurable audio outputs 264 e.g., the sound of waves and the sound of glass break. Processor 104 may be configured to simply layer and balance the volume of configurable audio outputs within two sets rather than applying transition techniques as described above. As a non-limiting example, processor 104 may directly overlay sounds of waves and glass breaking without the need for crossfade duration adjustments or synchronization points. Each sound may be played back at its natural timing, allowing the distinct audio profile of each to be preserved. The sound of waves may be continuously loop in the background, while the glass breaking sound may be triggered as a one-shot effect when needed. In some cases, volume level for each configurable audio output may be adjusted to ensure that no single configurable audio output overpowers the others. In other cases, each configurable audio output in composite audio output 260 may be handled independently, without the need for transition parameters 268.

Figure 3A:
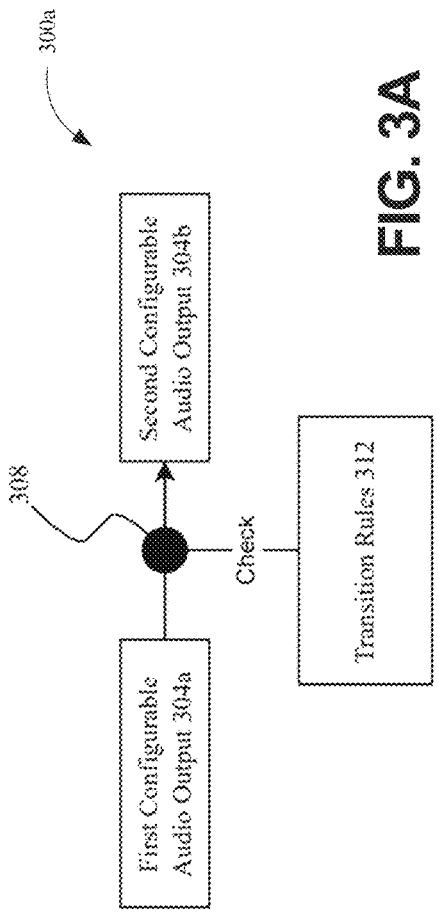
FIG. 3A is a block diagram of an exemplary embodiment of a process of transitioning between two configurable audio outputs.

Referring now to FIG. 3A, a block diagram of an exemplary embodiment of a process 300*a* of transitioning between two configurable audio outputs 304*a-b* are illustrated. In some cases, each configurable audio output may include a music segment, wherein a "segment," for the purpose of this disclosure, is a discrete unit of audio that is treated as a standalone element for playback and transition purposes. As a non-limiting example, music segment may include a self-contained audio file or a portion of an audio file that has a defined beginning and end (as shown in further detail below with reference to FIG. 3B). In some cases, each configurable audio output may include a complete musical piece, an ambient sound loop, a sound effect, or any other type of audio content as described above with reference to FIGS. 1A-D and 2.

With continued reference to FIG. 3A, apparatus as described herein may be configured to manage the playback of a first configurable audio output 304*a* ("first segment" 304*a* thereafter) and queue a second configurable audio output 304*b* ("second segment" 304*b* thereafter) for subsequent playback. In such embodiment, first segment 304*a* may be a currently playing audio output, while second segment 304*b* may be a next audio output scheduled for playback. Transition 308 from first segment 304*a* to second segment 304*b* may occur based on one or more pre-defined transition rules 312. As a non-limiting example, second segment 304*b* may be the next item in a preconfigured playlist (i.e., an audio playback container). As another non-limiting example, second segment 304*b* may represent a different configuration selected by a user, such as switching from an "explore" state to a "combat" state; thus, at least in part, a transition from one segment to another is contextually appropriate.

With continued reference to FIG. 3A, as described herein, "transition rules" are predefined criteria and procedures that govern how system transitions from one configurable audio output to another. Each transition rule may determine, for example, and without limitation, conditions under which transitions occur and specify, in some cases, the methods by which these transitions are executed to ensure a seamless auditory experience. As a non-limiting example, apparatus as described herein may first check whether transition rules associated with first segment 304*a* match the current playing segment. In some cases, this may include matching an identifier (e.g., segment ID) associated with first segment 304*a* or other defined structures that uniquely identify first segment 304*a* with the current playing segment. Additionally, or alternatively, matching between transition rules associated with second segment 304*b* and transition rules associated with next queued segment may be checked in a similar manner. In some cases, if no specific transition rules matches the criteria for both first segment 304*a* and second segment 304*b*, apparatus may default to a predefined transition rule that always provide a smooth and contextually appropriate transition.

With continued reference to FIG. 3A, in some cases, transition rules 312 may be identified by at least a processor, wherein one or more transition rules may define a more complex sequence of configurable audio outputs or audio containers instead of a simple transition to second segment 304*b*. As a non-limiting example, instead of directly transitioning to second segment 304*b*, processor may insert one or more additional segments or other configurable audio outputs, such as a brief crescendo or an intermediate ambient sound. When switching between "explore" state (first segment 304*a*) to "combat" state (second segment 304*b*), processor may identify a transition rule that specify a 2-second crossfade should be applied, with second segment 304*b* precisely on the beat where first segment 304 begins to fade out. However, if no specific transition rule is found, system may use a default transition rule which applies a general crossfade of 1.5 seconds. In other cases, processor may identify a transition rule configured to first introduce a sound effect e.g., distant roar, to bridge the gap between exploration and combat segments.

Figure 3B:
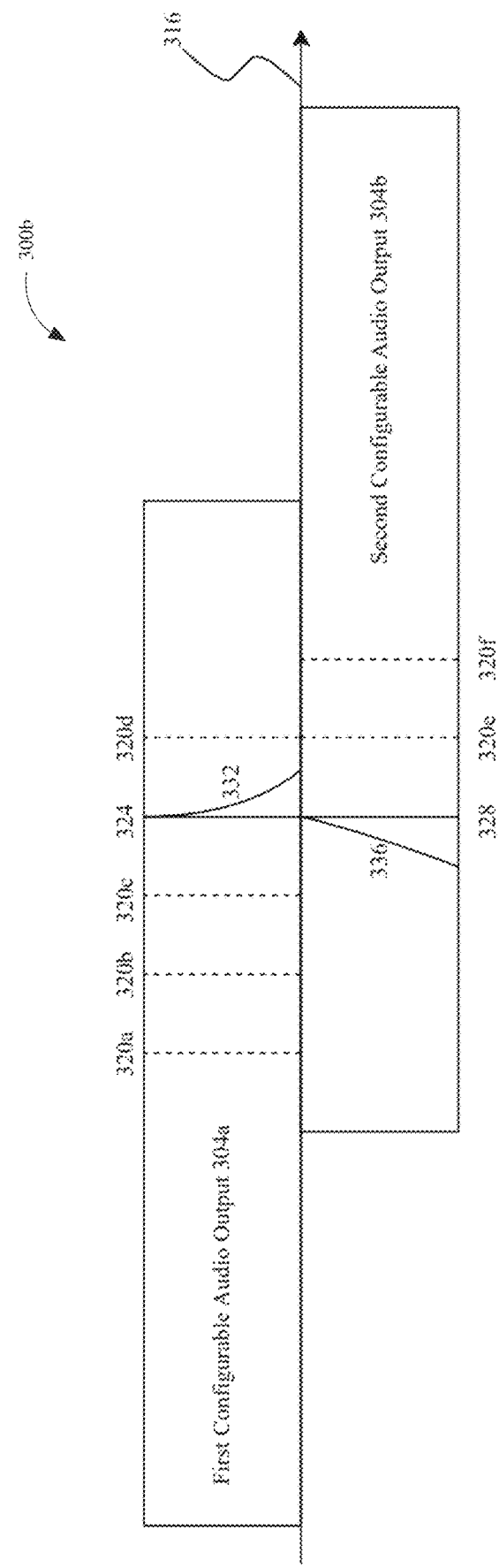
FIG. 3B is a visual representation of an exemplary transition between two configurable audio outputs.

Referring now to FIG. 3B, a visual representation of an exemplary transition 300*b* between two configurable audio outputs, first segment 304*a* and second segment 304*b*, is illustrated. In an embodiment, transition rule may be applied to control the timing (wherein horizontal axis 316 represent time), synchronization, and transition effect e.g., crossfading configurable audio outputs to ensure smooth and contextually appropriate transitions. In some cases, a plurality of sync points 320*a-f* may be predefined cues within configurable audio outputs that indicate optimal moments for transitions. Each sync point of the plurality of sync points 320*a-f* may be used to align, for example, and without limitation, the end of first segment 304*a* and the beginning of second segment 304*b*. As a non-limiting example, each segment may include at least one "entry cue" and an "exit cue" defined by default, wherein the entry cue marks the ideal point for the segment to start, while the exit cue indicates the best point for the segment to end. Additionally, or alternatively, transition rules may include one or more specific conditions to filter and select the most suitable sync points to ensure that transitions occur at the most appropriate moments based on tempo, rhythm, or other musical structures as described herein.

With continued reference to FIG. 3B, as a non-limiting example, exit point 324 may be identified by the processor as the moment when first segment 304*a* ends. In some cases, exit point 324 may be determined based on at least a sync point of plurality of sync points 320*a-f* or other criteria such as a fixed time or an instantaneous stop. In some cases, one or more transition rules may define conditions to search for the most suitable exit point, filtering possible sync points to find the one that best matches the desired transition. Entry point 328 may be subsequently identified (in a similar manner as exit point 324) by processor as the moment when second segment 304*b* begins. Apparatus may use, for example, and without limitation, an exponential fade 332 to smoothly introduce second segment 304*b* at exit point 324 where the first segment 304*a* fade out gradually (336). The overlapping fades (332 and 336) may ensure transition 300b between the two segments 304a-b is seamless and the musical flow is preserved.

Figure 4:
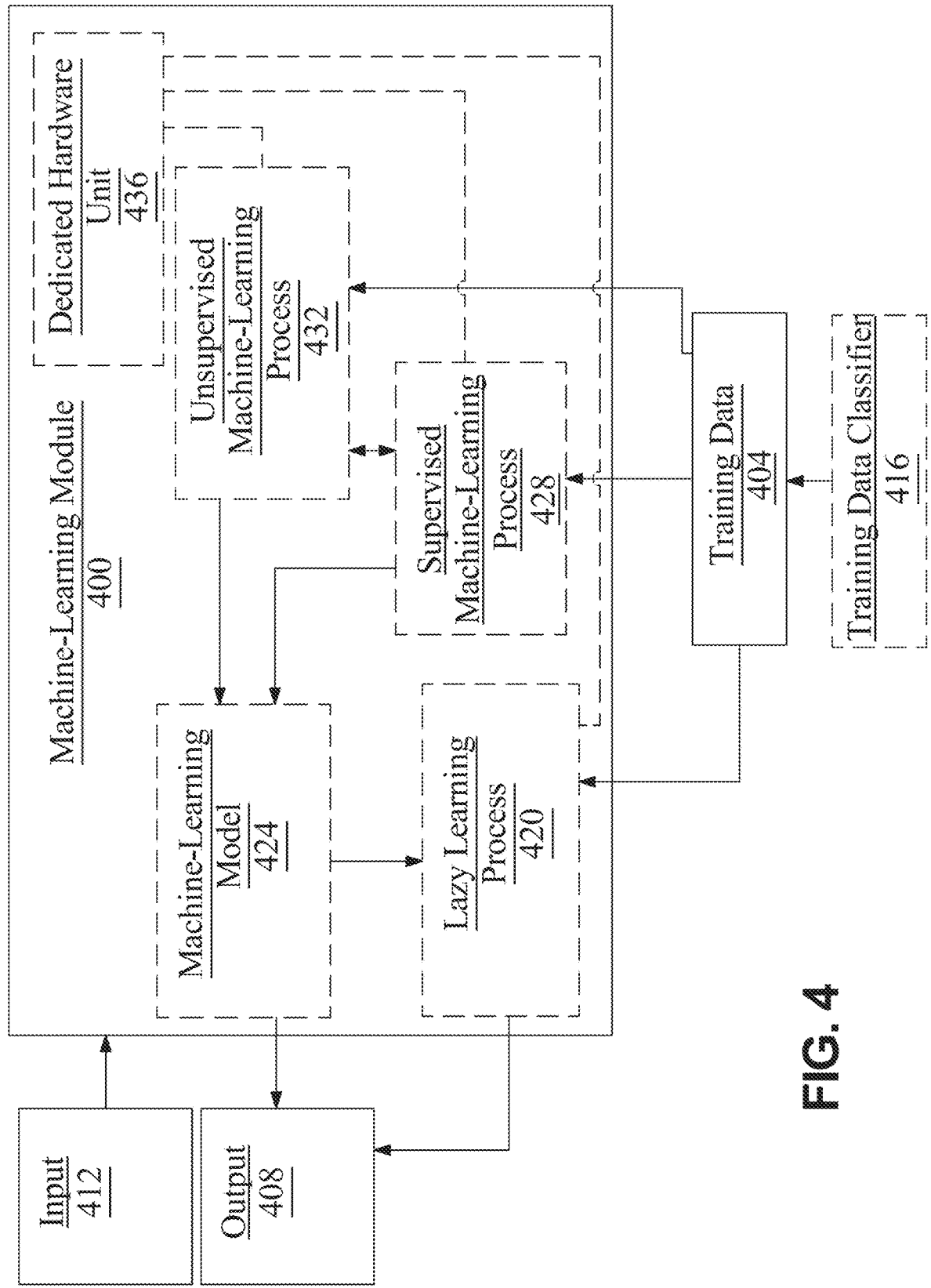
FIG. 4 is a block diagram illustrating an exemplary machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example training data may include labeled datasets containing a plurality of audio parameters as input correlated to a plurality of optimal transition parameters, effects, and/or transitional audio effects as output.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With further reference to FIG. 4, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may be identified as having poor quality data, where "poor quality" is defined as having a signal to noise ratio below a threshold value.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units. In some embodiments, and with continued reference to FIG. 4, computing device, processor, and/or module may down-sample elements of a training example to a desired lower number of data elements. As a non-limiting example, a high pixel count image may have 456 pixels, however a desired number of pixels may be 128. Processor may down-sample the high pixel count image to convert the 456 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include training data as described above, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised machine-learning processes 432 may not require a response variable; unsupervised machine-learning processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system, and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
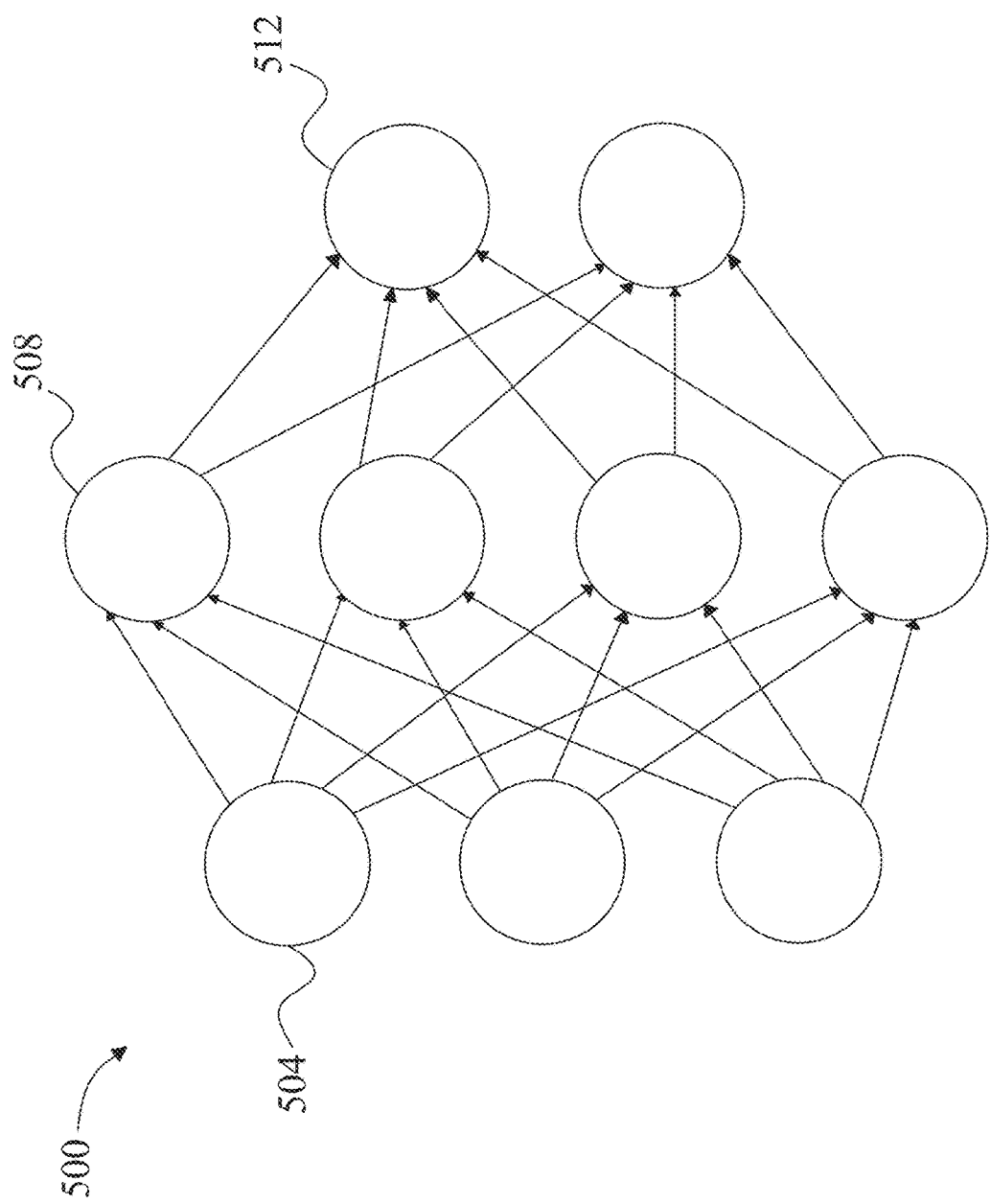
FIG. 5 is a diagram of an exemplary embodiment of a neural network.

Referring now to FIG. 5, an exemplary embodiment of neural network 500 is illustrated. A neural network 500, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
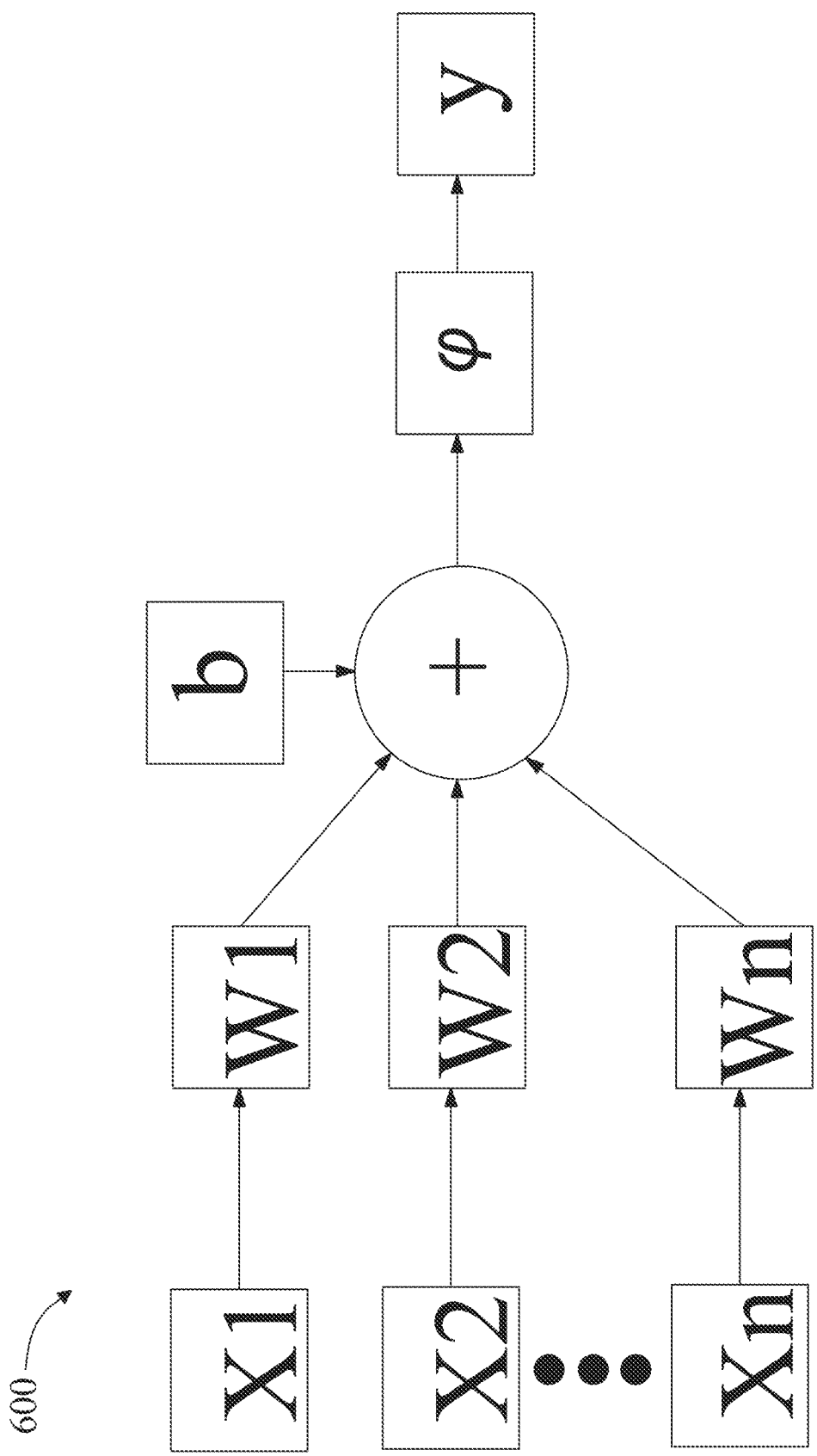
FIG. 6 is a diagram of an exemplary embodiment of a node of a neural network.

Referring now to FIG. 6, an exemplary embodiment of a node of a neural network 600 is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
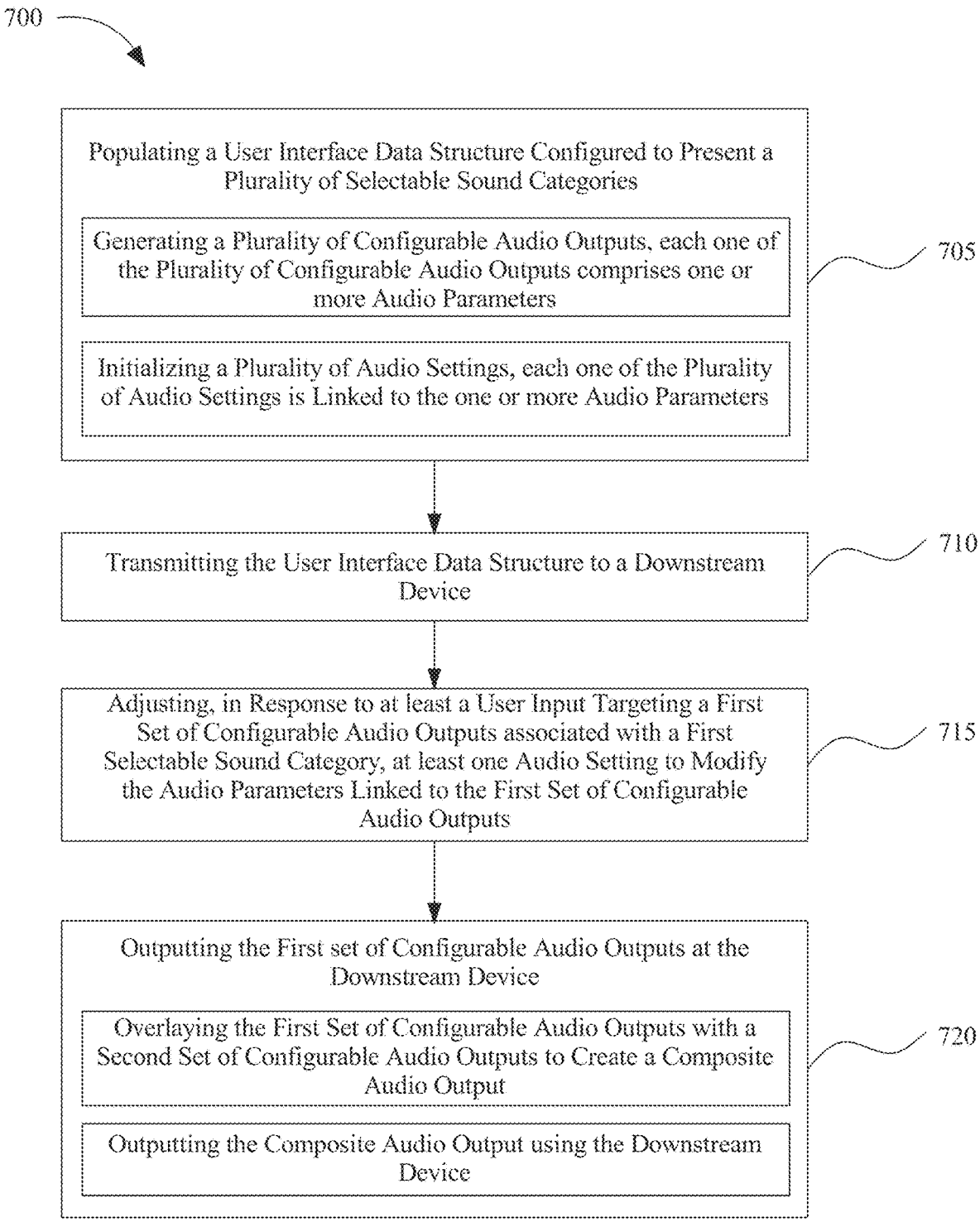
FIG. 7 is a flow diagram of an exemplary method for providing a customizable and interactive ambient sound experience.

Now referring to FIG. 7, a flow diagram of an exemplary embodiment of a method 700 for providing a customizable and interactive ambient sound experience is illustrated. The method 700 includes a step 705 of populating, by at least a processor, a user interface data structure configured to present a plurality of selectable sound categories, wherein populating the user interface data structure includes generating a plurality of configurable audio outputs for each selectable sound category of the plurality of selectable sound categories, wherein each configurable audio output of the plurality of configurable audio outputs includes one or more audio parameters, initializing a plurality of audio settings for the plurality of configurable audio outputs, wherein each audio setting of the plurality of audio settings is linked to the one or more audio parameters, and populate the user interface data structure as a function of the plurality of configurable audio outputs and the plurality of audio settings. In some embodiments, each selectable sound category of the plurality of selectable sound categories may include a scene selection and an audio playback container associated with the scene selection. In some embodiments, the audio playback container may be continuously rendered in a procedurally determined manner, wherein the rendering of the audio playback container persists until a subsequent user input modifies the scene selection. In some embodiments, each configurable audio output of the plurality of configurable audio outputs may include an environmental element selection and an environmental audio signal associated with the environmental element selection. In some embodiments, the plurality of audio settings may include at least an intensity setting. In some embodiments, the audio parameters may include one or more of audio volume, pitch, tempo, reverb, audio file selection (e.g., determining audio file inclusion/exclusion from a particular playlist object such as random container, playlist container, switch container, etc.), intervals for timed elements such as frequency of repetitively triggered elements, transition times, delay times, etc., EQ and filtering adjustments (cutoff frequency, bandwidth, bypass, etc.), and convolution/resynthesis parameters (e.g., FFT bucket size, phase, and amplitude). This may be implemented, without limitation, as described above with reference to FIGS. 1A-D, 2, 3A-B, and 4-6.

With continued reference to FIG. 7, method 700 includes a step of 710 of transmitting, by the at least a processor, the populated user interface data structure to a downstream device. In some embodiments, the downstream device may include a display device, and transmitting the user interface data structure comprises displaying, at the display device, the user interface data structure through a user interface. This may be implemented, without limitation, as described above with reference to FIGS. 1A-D, 2, 3A-B, and 4-6.

With continued reference to FIG. 7, method 700 includes a step 715 of adjusting, by the at least a processor, in response to at least a user input targeting a first set of configurable audio outputs of the plurality of configurable audio outputs associated with a first selectable sound category of the plurality of selectable sound categories, at least one audio setting of the plurality of audio settings to modify the audio parameters linked to the first set of configurable audio outputs. This may be implemented, without limitation, as described above with reference to FIGS. 1A-D, 2, 3A-B, and 4-6.

With continued reference to FIG. 7, method 700 includes a step 720 of outputting, by the at least a processor, a first set of configurable audio outputs at the downstream device, wherein outputting the first set of configurable audio outputs may include overlaying the first set of configurable audio outputs with a second set of configurable audio outputs to create a composite audio output and outputting the composite audio output using the downstream device. In some embodiments, the plurality of configurable audio outputs may include a plurality of temporary configurable audio outputs. In some embodiments, temporary configurable audio output of the plurality of temporary configurable audio outputs may include a user-initiated event and at least an audio signal, characterized by a pre-defined duration, generated in response to the user-initiated event. In some embodiments, overlaying the first set of configurable audio outputs with a second set of configurable audio outputs may include determining a transition parameter, for the first set of configurable audio outputs and the second set of configurable audio outputs, based on the respective audio parameters, wherein the transition parameter may include at least a sync point, and overlaying the first set of configurable audio outputs with the second set of configurable audio outputs as a function of the transition parameters. This may be implemented, without limitation, as described above with reference to FIGS. 1A-D, 2, 3A-B, and 4-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
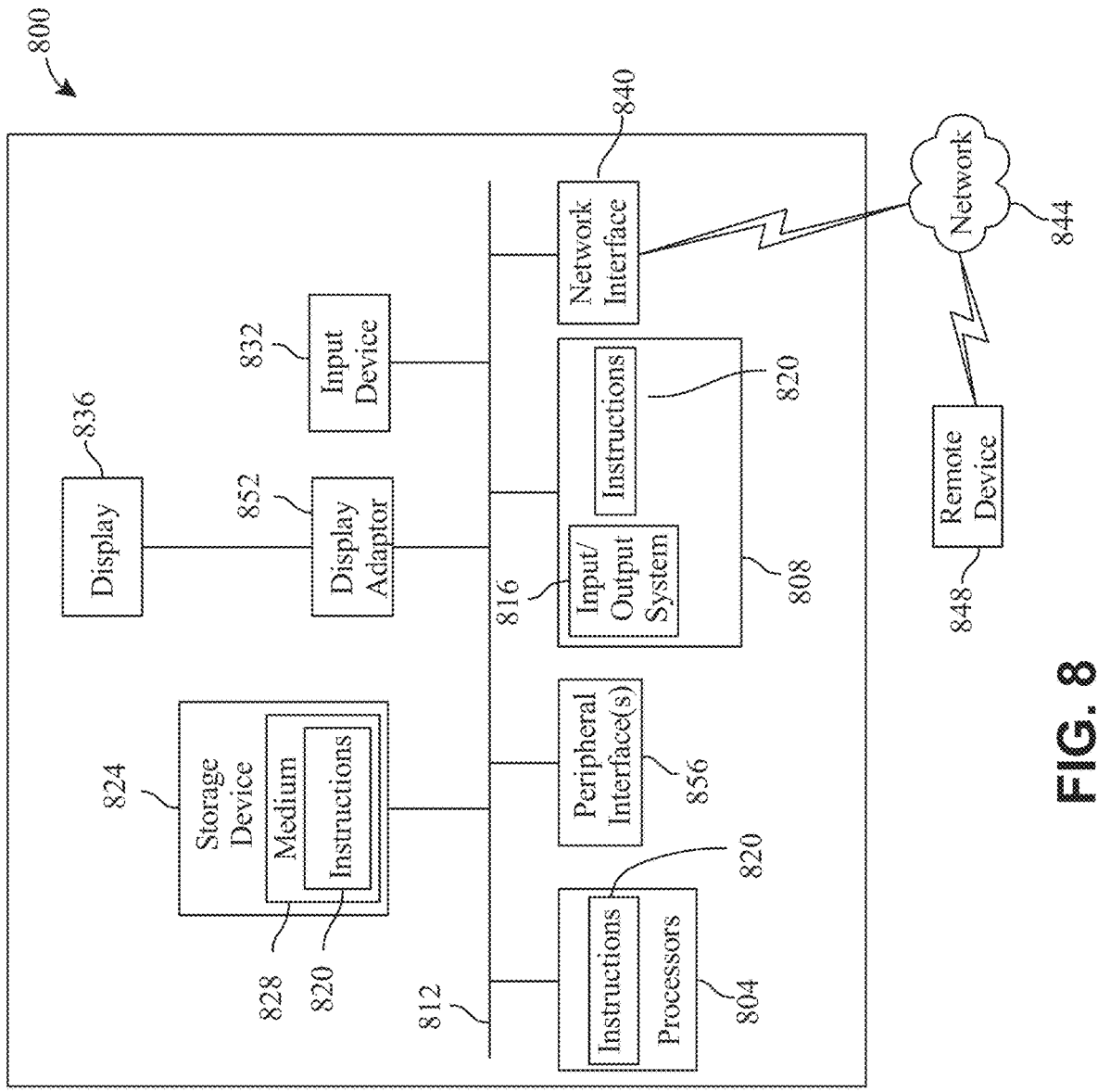
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display device 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for providing a customizable and interactive ambient sound experience, the apparatus comprises:
at least a processor; and
a memory communicatively connected to the at least a processor, wherein the memory contains instructions configuring the at least a processor to:
populate a user interface data structure configured to present a plurality of selectable sound categories, wherein each of the plurality of selectable sound categories comprises a scene selection and an audio playback container associated with the scene selection, wherein the audio playback container is continuously rendered in a procedurally determined manner, wherein the rendering of the audio playback container persists until a subsequent user input modifies the scene selection, and wherein populating the user interface data structure comprises:
generating a plurality of configurable audio outputs for each selectable sound category of the plurality of selectable sound categories, wherein each configurable audio output of the plurality of configurable audio outputs comprises one or more audio parameters;
initializing a plurality of audio settings for the plurality of configurable audio outputs, wherein each audio setting of the plurality of audio settings is linked to the one or more audio parameters; and
populate the user interface data structure as a function of the plurality of configurable audio outputs and the plurality of audio settings;
transmit the populated user interface data structure to a downstream device;
adjust, in response to at least a user input targeting a first set of configurable audio outputs of the plurality of configurable audio outputs associated with a first selectable sound category of the plurality of selectable sound categories, at least one audio setting of the plurality of audio settings to modify the audio parameters linked to the first set of configurable audio outputs; and
output, at the downstream device, the first set of configurable audio outputs, wherein outputting the first set of configurable audio outputs comprises:
overlaying the first set of configurable audio outputs with a second set of configurable audio outputs to create a composite audio output; and
outputting the composite audio output using the downstream device.

2. The apparatus of claim 1, wherein:
the downstream device comprises a display device; and
transmitting the user interface data structure comprises displaying, at the display device, the user interface data structure through a user interface.

3. The apparatus of claim 1, wherein each configurable audio output of the plurality of configurable audio outputs comprises an environmental element selection and an environmental audio signal associated with the environmental element selection.

4. The apparatus of claim 1, wherein the plurality of configurable audio outputs comprises a plurality of temporary configurable audio outputs.

5. The apparatus of claim 4, wherein each temporary configurable audio output of the plurality of temporary configurable audio outputs comprises a user-initiated event and at least an audio signal, characterized by a pre-defined duration, generated in response to the user-initiated event.

6. The apparatus of claim 1, wherein the plurality of audio settings comprises at least an intensity setting.

7. The apparatus of claim 1, wherein the audio parameters comprise one or more of audio volume, pitch, tempo, reverb, audio file selection, time interval, filtering adjustments, and convolution parameters.

8. The apparatus of claim 1, wherein overlaying the first set of configurable audio outputs with the second set of configurable audio outputs comprises:
determining a transition parameter, for the first set of configurable audio outputs and the second set of configurable audio outputs, based on the respective audio parameters, wherein the transition parameter comprises at least a sync point; and
overlaying the first set of configurable audio outputs with the second set of configurable audio outputs as a function of the transition parameters.

9. A method for providing a customizable and interactive ambient sound experience, the method comprises:
populating, by at least a processor, a user interface data structure configured to present a plurality of selectable sound categories, wherein each of the plurality of selectable sound categories comprises a scene selection and an audio playback container associated with the scene selection, wherein the audio playback container is continuously rendered in a procedurally determined manner, wherein the rendering of the audio playback container persists until a subsequent user input modifies the scene selection, and wherein populating the user interface data structure comprises:

generating a plurality of configurable audio outputs for each selectable sound category of the plurality of selectable sound categories, wherein each configurable audio output of the plurality of configurable audio outputs comprises one or more audio parameters;

initializing a plurality of audio settings for the plurality of configurable audio outputs, wherein each audio setting of the plurality of audio settings is linked to the one or more audio parameters; and populate the user interface data structure as a function of the plurality of configurable audio outputs and the plurality of audio settings;

transmitting, by the at least a processor, the populated user interface data structure to a downstream device;

adjusting, by the at least a processor, in response to at least a user input targeting a first set of configurable audio outputs of the plurality of configurable audio outputs associated with a first selectable sound category of the plurality of selectable sound categories, at least one audio setting of the plurality of audio settings to modify the audio parameters linked to the first set of configurable audio outputs; and outputting, by the at least a processor, the first set of configurable audio outputs at the downstream device, wherein outputting the first set of configurable audio outputs comprises:

overlaying the first set of configurable audio outputs with a second set of configurable audio outputs to create a composite audio output; and outputting the composite audio output using the downstream device.

10. The method of claim 9, wherein:
the downstream device comprises a display device; and
transmitting the user interface data structure comprises displaying, at the display device, the user interface data structure through a user interface.

11. The method of claim 9, wherein each configurable audio output of the plurality of configurable audio outputs comprises an environmental element selection and an environmental audio signal associated with the environmental element selection.

12. The method of claim 9, wherein the plurality of configurable audio outputs comprises a plurality of temporary configurable audio outputs.

13. The method of claim 12, wherein each temporary configurable audio output of the plurality of temporary configurable audio outputs comprises a user-initiated event and at least an audio signal, characterized by a pre-defined duration, generated in response to the user-initiated event.

14. The method of claim 9, wherein the plurality of audio settings comprises at least an intensity setting.

15. The method of claim 9, wherein the audio parameters comprise one or more of audio volume, pitch, tempo, reverb, audio file selection, time interval, filtering adjustments, and convolution parameters.

16. The method of claim 9, wherein overlaying the first set of configurable audio outputs with the second set of configurable audio outputs comprises:

determining a transition parameter, for the first set of configurable audio outputs and the second set of configurable audio outputs, based on the respective audio parameters, wherein the transition parameter comprises at least a sync point; and overlaying the first set of configurable audio outputs with the second set of configurable audio outputs as a function of the transition parameters.

* * * * *